(12) United States Patent
Yamamoto et al.

(10) Patent No.: US 12,537,441 B2
(45) Date of Patent: Jan. 27, 2026

(54) POWER SUPPLY SEMICONDUCTOR DEVICE AND POWER SUPPLY APPARATUS WITH DISCHARGE CONTROL CIRCUIT

(71) Applicant: Rohm Co., Ltd., Kyoto (JP)

(72) Inventors: Natsuki Yamamoto, Kyoto (JP); Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 270 days.

(21) Appl. No.: 18/347,944

(22) Filed: Jul. 6, 2023

(65) Prior Publication Data
US 2024/0014730 A1    Jan. 11, 2024

(30) Foreign Application Priority Data
Jul. 7, 2022   (JP) .................................. 2022-109553

(51) Int. Cl.
*H02M 1/32*    (2007.01)
*H02M 7/12*    (2006.01)

(52) U.S. Cl.
CPC .............. *H02M 1/322* (2021.05); *H02M 7/12* (2013.01)

(58) Field of Classification Search
CPC ................................. H02M 1/32; H02M 1/322
See application file for complete search history.

(56) References Cited

U.S. PATENT DOCUMENTS

| | | | | |
|---|---|---|---|---|
| 7,492,614 B2* | 2/2009 | Furukoshi | ............ | H02M 3/335 363/21.01 |
| 2013/0027983 A1* | 1/2013 | Nate | ..................... | H02M 3/335 363/21.01 |
| 2013/0033236 A1* | 2/2013 | Li | ......................... | H02J 7/0036 327/333 |
| 2013/0242626 A1* | 9/2013 | Li | ............................ | G02B 9/02 307/326 |
| 2014/0036561 A1* | 2/2014 | Sakurai | .................. | H02M 7/06 363/126 |
| 2014/0307486 A1* | 10/2014 | Huang | ................. | H02M 3/335 363/21.16 |
| 2017/0346325 A1* | 11/2017 | Ohtake | .................... | H02M 7/06 |
| 2018/0183348 A1* | 6/2018 | Hu | .......................... | H02M 5/42 |
| 2020/0099287 A1* | 3/2020 | Chen | ....................... | H02M 7/06 |

FOREIGN PATENT DOCUMENTS

JP    2015-177687    10/2015

* cited by examiner

*Primary Examiner* — Gustavo A Rosario-Benitez
(74) *Attorney, Agent, or Firm* — Fish & Richardson P.C.

(57) ABSTRACT

A full-rectified voltage of an alternating-current is generated on a target wiring, and another rectification voltage is fed to a first input terminal. A second input terminal is connected to the target wiring. A main capacitor is provided between a potential control terminal and the target wiring. A first switching element is provided between the potential control terminal and the ground. In the supply period of the alternating-current voltage, the first switching element is turned on and off based on the voltages at the first input terminal and the potential control terminal. When power failure is sensed, an interphase capacitor is discharged via the first input terminal and a second switching element and then the main capacitor is discharged via the first and second switching elements.

9 Claims, 11 Drawing Sheets

POWER SUPPLY SEMICONDUCTOR DEVICE AND POWER SUPPLY APPARATUS WITH DISCHARGE CONTROL CIRCUIT

CROSS-REFERENCE TO RELATED APPLICATIONS

This nonprovisional application claims priority under 35 U.S.C. § 119(a) on Patent Application No. 2022-109553 filed in Japan on Jul. 7, 2022, the entire contents of which are hereby incorporated by reference.

BACKGROUND OF THE DISCLOSURE

Field of the Invention

The present disclosure relates to a power supply semiconductor device and to a power supply apparatus.

Description of Related Art

A power supply apparatus that can generate from an alternating-current voltage a direct-current voltage often includes an interphase capacitor and a main capacitor. The interphase capacitor is often called an X capacitor. The interphase capacitor is connected to a pair of input terminals that receives the alternating-current voltage. The main capacitor is connected to a wiring fed with a full-rectified voltage of the alternating-current voltage.

Patent Document 1: Japanese Patent Application published as No. 2015-177687

When the supply of the alternating-current voltage to the power supply apparatus is cut off, from the perspective of ensuring safety and the like, the interphase capacitor and the main capacitor should be discharged. However, it is challenging in many aspects to work out a technique of discharging both the interphase capacitor and the main capacitor; thus, expectations are high for the development of a practical discharge technique.

SUMMARY OF THE DISCLOSURE

The present disclosure is aimed at providing a power supply semiconductor device and a power supply apparatus that, on occurrence of power failure, can discharge an interphase capacitor and a main capacitor (in particular, for example, achieve that with a simple configuration).

According to one aspect of the present disclosure, a power supply semiconductor device is used in a power supply apparatus that feeds to a diode bridge an alternating-current voltage applied to a pair of input terminals to generate a full-rectified voltage on a target wiring. The power supply semiconductor device includes: a first input terminal configured to receive a rectification voltage obtained by feeding the alternating-current voltage applied to the pair of input terminals to a full-wave rectifier circuit different from the diode bridge; a second input terminal configured to be connected to the target wiring; a potential control terminal configured to be connected to the target wiring through a main capacitor; a first switching element provided between the potential control terminal and the ground; a power failure sense circuit configured to sense, based on the voltage at the first input terminal; power failure in which the supply of the alternating-current voltage to the pair of input terminals is cut off; a second switching element configured to, when power failure is sensed, pass to the ground a current for discharging an interphase capacitor provided between the pair of input terminals and a current for discharging the main capacitor; and a control circuit configured to control the first and second switching elements. The control circuit, in the supply period of the alternating-current voltage to the pair of input terminals, turns on and off the first switching element based on the voltage at the first input terminal and the voltage at the potential control terminal. The control circuit, when power failure is sensed, performs first discharge operation and then second discharge operation. In the first discharge operation, the first switching element is kept off and the second switching element is kept on so that the interphase capacitor is discharged through a first discharging path that runs across the full-wave rectifier circuit, the first input terminal, and the second switching element. The first discharging path includes the ground. In the second discharge operation, the first and second switching elements are kept on so that the main capacitor is discharged through a second discharging path that runs across the first switching element, the second input terminal, and the second switching element. The second discharging path includes the ground.

According to the present disclosure, it is possible to provide a power supply semiconductor device and a power supply apparatus that, on occurrence of power failure, can discharge an interphase capacitor and a main capacitor (in particular, achieve that with a simple configuration).

DETAILED DESCRIPTION OF PREFERRED EMBODIMENTS

Figure 1:
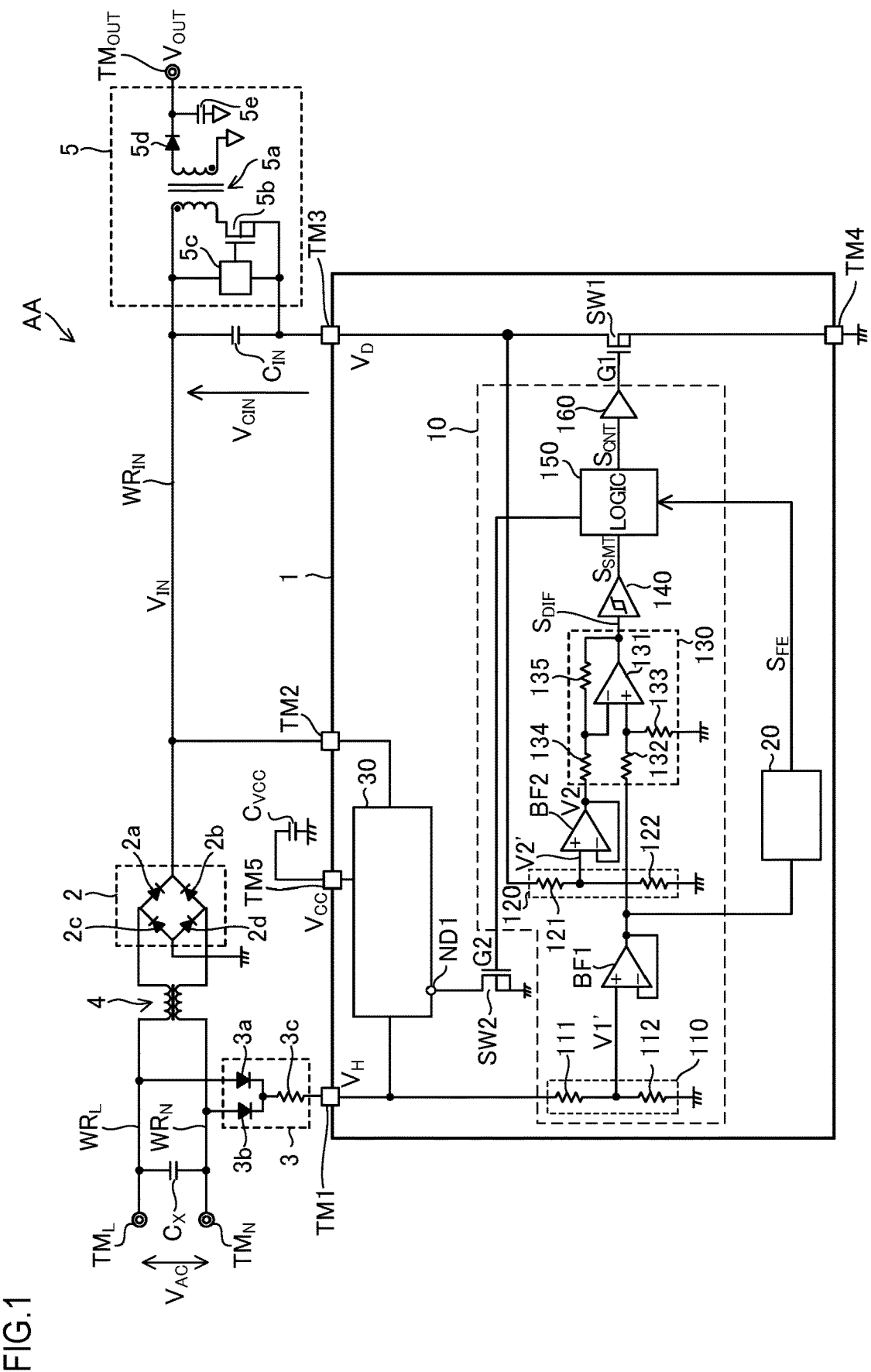
FIG. 1 is a configuration diagram of a power supply apparatus according to an embodiment of the present disclosure.

Hereinafter, examples of implementing the present disclosure will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, functional blocks, circuits, elements, parts, and the like are occasionally used with omission or abbreviation of the names of the information, signals, physical quantities, functional blocks, circuits, elements, parts, and the like corresponding to those symbols and reference signs. For example, the Schmitt trigger circuit described later and identified by the reference sign "140" (see FIG. 1) is sometimes referred to as the Schmitt trigger circuit 140 and other times abbreviated to the circuit 140, both referring to the same entity.

First, some of the terms used to describe embodiments of the present disclosure will be defined. "Level" denotes the level of a potential, and for any signal or voltage of interest, "high level" has a higher potential than "low level". For any signal or voltage of interest, its being at high level means, more precisely, its level being equal to high level, and its being at low level means, more precisely, its level being equal to low level.

For any signal or voltage of interest, a transition from low level to high level is occasionally referred to as an up edge. "Up edge" can be read as "rising edge". Likewise, for any signal or voltage of interest, a transition from high level to low level is occasionally referred to as a down edge. "Down edge" can be read as "falling edge".

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor". Unless otherwise stated, any MOSFET can be understood to have its back gate short-circuited to its source.

In the following description, for any transistor, its being in the on or off state is occasionally expressed simply as its being on or off respectively. For any transistor, its switch from the off to the on state is termed "turn-on", and its switch from the on to the off state is termed "turn-off". Similar definitions apply to any switching element. For any transistor or switching element, a period in which it is in the on state is occasionally referred to as an on period, and a period in which it is in the off state is occasionally referred to as an off period.

Wherever "connection" is discussed among a plurality of parts constituting a circuit, as among circuit elements, wirings, nodes, and the like, the term is to be understood to denote "electrical connection".

FIG. 1 is a configuration diagram of a power supply apparatus AA according to an embodiment of the present disclosure. The power supply apparatus AA is an AC-DC converter for generating a direct-current voltage from an alternating-current voltage.

The power supply apparatus AA includes, as its main components, a semiconductor device 1 as a power supply semiconductor device, a diode bridge 2, a full-wave rectifier circuit 3, a filter 4, a power conversion circuit 5, and capacitors $C_X$, $C_{IN}$, and $C_{VCC}$. Also the wirings for connecting between the components of the power supply apparatus AA (for example, wirings $WR_L$, $WR_N$, and $WR_{IN}$, described later) are included among the components of the power supply apparatus AA.

The semiconductor device 1 is an electronic component that includes a semiconductor chip having a semiconductor integrated circuit formed on a semiconductor substrate, a package for accommodating the semiconductor chip, a plurality of external terminals exposed out of the package to outside the semiconductor device 1. The semiconductor device 1 is formed by sealing the semiconductor chip in the package formed of resin. While FIG. 1 shows terminals TM1 to TM5 as some of the plurality of external terminals, other external terminals than these are also included in the semiconductor device 1.

The power supply apparatus AA has a pair of input terminals (a pair of power input terminals), and the alternating-current voltage $V_{AC}$ fed to the power supply apparatus AA is applied to the pair of input terminals. The pair of input terminals include input terminals $TM_L$ and $TM_N$. The period during which the alternating-current voltage $V_{AC}$ is fed to the power supply apparatus AA is referred to as the supply period of the alternating-current voltage $V_{AC}$. An incident in which the supply of the alternating-current voltage $V_{AC}$ to the power supply apparatus AA is cut off is referred to as power failure. The period during which the alternating-current voltage $V_{AC}$ is not supplied to the power supply apparatus AA, that is, the period during which the supply of the alternating-current voltage $V_{AC}$ to the power supply apparatus AA is cut off is referred to as the non-supply period of the alternating-current voltage $V_{AC}$ or the power-failure period. The alternating-current voltage $V_{AC}$ may be a commercial alternating-current voltage that is output from an unillustrated commercial power source, and the effective current value of the alternating-current voltage $V_{AC}$ is any value within the range of, for example, 90 V to 264 V. During the supply period of the alternating-current voltage $V_{AC}$, the power supply apparatus AA performs full-wave rectification on the alternating-current voltage $V_{AC}$ with the diode bridge 2 to generate a full-rectified voltage on the wiring $WR_{IN}$ (target wiring). Then, the power supply apparatus AA converts the terminal-to-terminal voltage across the capacitor $C_{IN}$ based on the full-wave rectification voltage into another voltage (output voltage $V_{OUT}$, described later) with the power conversion circuit 5.

The filter 4 is a common-mode filter and reduces common-mode noise that can be superposed on the alternating-current voltage $V_{AC}$. The filter 4 includes a first and a second coil that are magnetically coupled together. In the filter 4, the first terminal of the first coil is connected to the input terminal $TM_L$ via the wiring $WR_L$, and the second terminal of the first coil is connected to the diode bridge 2. In the filter 4, the first terminal of the second coil is connected to the input terminal $TM_N$ via the wiring $WR_N$, and the second terminal of the second coil is connected to the diode bridge 2. The wiring $WR_L$ refers to the wiring between the input terminal $TM_L$ and the first coil in the filter 4, and the wiring $WR_N$ refers to the wiring between the input terminal $TM_N$ and the second coil of the filter 4. The alternating-current voltage $V_{AC}$ having common-mode noise reduced by the filter 4 is fed to the diode bridge 2.

The diode bridge 2, during the supply period of the alternating-current voltage $V_{AC}$, performs full-wave rectification on the alternating-current voltage $V_{AC}$ supplied via the filter 4. The full-rectified voltage obtained by full-wave rectification in the diode bridge 2 is applied to the wiring $WR_{IN}$. Specifically, the diode bridge 2 includes rectifier diodes 2a to 2d. The second terminal of the first coil in the filter 4 is connected to the anode of the rectifier diode 2a and to the cathode of the rectifier diode 2c. The second terminal of the second coil in the filter 4 is connected to the anode of the rectifier diode 2b and to the cathode of the rectifier diode 2d. The anodes of the rectifier diodes 2c and 2d are connected to the ground. The cathodes of the rectifier diodes 2a and 2b are connected to the wiring $WR_{IN}$.

The capacitor $C_X$ is an interphase capacitor connected to the wirings $WR_L$ and $WR_N$. In general, an interphase capacitor is often referred to as an X capacitor. One terminal of the interphase capacitor $C_X$ is connected to the wiring $WR_L$, and the other terminal of the interphase capacitor $C_X$ is connected to the wiring $WR_N$. The interphase capacitor $C_X$ contributes to reduced high-frequency normal node noise.

The full-wave rectifier circuit 3 is a rectifier circuit for the alternating-current voltage $V_{AC}$ provided separately from the diode bridge 2. The full-wave rectifier circuit 3 includes rectifier diodes 3a, 3b and a resistor 3c. The anode of the rectifier diode 3a is connected to the wiring $WR_L$. The anode of the rectifier diode 3b is connected to the wiring $WR_N$. The cathodes of the rectifier diodes 3a and 3b are connected to each other and to the terminal TM1 via the resistor 3c. That is, the cathodes of the rectifier diodes 3a and 3b are connected to one terminal of the resistor 3c, and the other terminal of the resistor 3c is connected to the terminal TM1. During the supply period of the alternating-current voltage $V_{AC}$, the cathodes of the rectifier diodes 3a and 3b (hence the terminal TM1) are fed with a full-wave rectification voltage of the alternating-current voltage $V_{AC}$. A full-wave rectification voltage is equivalent to the full-rectified voltage. Here, to verbally distinguish the rectification voltage generated by the diode bridge 2 from the rectification voltage generated by the full-wave rectifier circuit 3, the latter rectification voltage is referred to as the full-wave rectification voltage (the former rectification voltage may be referred to as a first full-wave rectification voltage and the latter rectification voltage as a second full-wave rectification voltage).

Hereinafter, the voltage at the terminal TM1 is referred to as the voltage $V_H$. At any time point during the supply period of the alternating-current voltage $V_{AC}$, the value of the full-wave rectification voltage of the alternating-current voltage $V_{AC}$ (that is, the value of the voltage $V_H$) equals the absolute value of the instantaneous value of the alternating-current voltage $V_{AC}$ (here, the forward voltages across the rectifier diodes 3a and 3b and the voltage drop across the resistor 3c are assumed to be sufficiently low to be ignored).

The voltage fed to the wiring $WRI_N$ is referred to as the voltage $V_{IN}$. The terminal TM2 is connected to the wiring $WR_{IN}$ and receives the voltage $V_{IN}$. The capacitor $C_{IN}$ is a main capacitor (input capacitor) connected between the wiring $WR_{IN}$ and the terminal TM3. That is, to the wiring $WR_{IN}$, one terminal (anode) of the main capacitor $C_{IN}$ is connected, and to the terminal TM3, the other terminal (cathode) of the main capacitor $C_{IN}$ is connected. The terminal-to-terminal voltage across the main capacitor $C_{IN}$ is referred to as the capacitor voltage $V_{CIN}$. The capacitor voltage $V_{ON}$ is assumed to denote the potential of the wiring $WR_{IN}$ relative to the potential at the terminal TM3. The main capacitor $C_{IN}$ has a function of smoothing the voltage fed from the diode bridge 2 to the wiring $WR_{IN}$, and the smoothed voltage is applied to the wiring $WR_{IN}$. Hereinafter, the voltage at the terminal TM3 is referred to as the voltage $V_D$. The terminal TM4 is connected to the ground.

The power conversion circuit 5 is connected to the wiring $WR_{IN}$ and to the terminal TM3. As will be described later, during the supply period of the alternating-current voltage $V_{AC}$, the capacitor voltage $V_{CIN}$ has a generally constant voltage value and is, in strict terms, a pulsating voltage kept around a constant voltage. The power conversion circuit 5 operates based on the capacitor voltage $V_{CIN}$, and performs power conversion to convert the capacitor voltage $V_{CIN}$ into another voltage $V_{OUT}$. The voltage $V_{OUT}$ is the output voltage $V_{OUT}$ of the power conversion circuit 5.

In the configuration example shown in FIG. 1, the power conversion circuit 5 is a switching power supply circuit of a flyback type and includes a transformer 5a, a power transistor 5b configured as an n-channel MOSFET, a switching control device 5c, a rectifier diode 5d, and an output capacitor 5e. The transformer 5a includes a primary and a secondary winding. In the transformer 5a, the primary and secondary windings are, while being electrically isolated from each other, magnetically coupled together with opposite polarities. One terminal of the primary winding is connected to the wiring $WR_{IN}$, and the other terminal of the primary winding is connected to the drain of the power transistor 5b. The source of the power transistor 5b is connected to the terminal TM3. The switching control device 5c is connected to the wiring $WRI_N$ and to the terminal TM3 and operates using the capacitor voltage $V_{CIN}$ as a supply voltage. Or, the supply voltage to the switching control device 5c may be generated based on the voltage generated at an auxiliary winding (not shown) provided in the transformer 5a. The switching control device 5c is connected to the gate of the power transistor 5b and switches the power transistor 5b (turns it on and off alternately) at a predetermined switching frequency by controlling the gate potential of the power transistor 5b.

The first terminal of the secondary winding of the transformer 5a is connected to the anode of the rectifier diode 5d. The cathode of the rectifier diode 5d and the first terminal of the output capacitor 5e are connected to an output terminal $TM_{OUT}$. The second terminal of the secondary winding of the transformer 5a and the second terminal of the output capacitor 5e are connected to a predetermined secondary-side reference potential point. The secondary-side reference potential point is a reference potential point of the circuits provided on the secondary side of the transformer 5a. A voltage that is higher by the output voltage $V_{OUT}$ than the potential at the secondary-side reference potential point is fed to the output terminal $TM_{OUT}$. In the embodiment, the ground denotes a primary-side reference potential point, which is a reference potential point of the circuits provided on the primary side of the transformer 5a, and the primary-side reference potential point has a potential of 0 V. In the embodiment, any voltage mentioned with no particular reference mentioned indicates a potential relative to the ground. The potential at the primary-side reference potential point may be referred to as the ground potential. The secondary-side reference potential point is electrically isolated from the primary-side reference potential point (though the primary- and secondary-side reference potential points may be a common potential point).

During the on-period of the power transistor 5b, a current based on the capacitor voltage $V_{CIN}$ passes through the primary winding of the transformer 5a and thereby energy based on the current is accumulated in the transformer 5a. During the off-period of the power transistor 5b, a current based on the energy accumulated in the transformer 5a passes from the secondary winding through the rectifier diode 5d toward the output terminal $TM_{OUT}$. Thus, the output voltage $V_{OUT}$ appears as a direct-current voltage across the output capacitor 5e. Although not specifically illustrated, in the power conversion circuit 5, feedback control for keeping the output voltage $V_{OUT}$ constant may be performed.

Here, the power conversion circuit 5 is configured as an isolated DC-DC converter of a flyback type; instead, it may be configured as an isolated DC-DC converter of a forward type, or, it may employ, in the secondary side, synchronous rectification instead of diode rectification. The power conversion circuit 5 does not necessarily need to include a transformer; it may be a non-isolate type DC-DC converter. The power conversion circuit 5 can be configured in any way so long as it can generate based on the capacitor voltage $V_{CIN}$ any other direct-current voltage as an output voltage $V_{OUT}$. The output voltage $V_{OUT}$ may be a direct-current voltage with reference to the potential at the secondary-side reference potential point as in the configuration example shown in FIG. 1, or may be a direct-current voltage with reference to the potential at the terminal TM3 or the potential of the ground.

The semiconductor device 1 includes, as its main components, switching elements SW1 and SW2, a control circuit 10, a power failure sense circuit 20, and a regulator circuit 30 with a discharge function. Here, the switching elements SW1 and SW2 are configured with n-channel MOSFETs and hereinafter the switching elements SW1 and SW2 may be referred to as the transistors SW1 and SW2.

The semiconductor device 1 has a function of controlling the potential at the terminal TM3 through on/off control of the transistor SW1 to keep the capacitor voltage $V_{CIN}$ at or lower than a predetermined limit voltage $V_{LIM}$. Thus, the terminal TM3 can be referred to also as the potential control terminal. The limit voltage $V_{LIM}$ is lower than the maximum peak value of the alternating-current voltage $V_{AC}$. If the maximum effective voltage value of the alternating-current voltage $V_{AC}$ is 264 V, the peak value of the alternating-current voltage $V_{AC}$ as it is when the effective voltage value of the alternating-current voltage $V_{AC}$ is 264 V is the maximum peak value of the alternating-current voltage $V_{AC}$. If the cathode of the main capacitor $C_{IN}$ is constantly connected to the ground, a voltage of about 400 V at the maximum is applied across the main capacitor $C_{IN}$; thus, the main capacitor $C_{IN}$ needs to be given a withstand voltage higher than that voltage. Owing to the function of the semiconductor device 1 described above, the power supply apparatus AA permits the withstand voltage of the main capacitor $C_{IN}$ to be reduced down to a withstand voltage commensurate with the limit voltage $V_{LIM}$.

The transistor SW1 is provided between the terminal TM3 and the ground. Specifically, the drain of the transistor SW1 is connected to the terminal TM3, and the source of the transistor SW1 is connected to the terminal TM4. As described above, the terminal TM4 is connected to the ground. The signal fed to the gate of the transistor SW1 is referred to as the gate signal G1. The gate signal G1 is fed from a drive circuit 160, described later, to the gate of the transistor SW1. The transistor SW1 is on when the gate signal G1 is at high level, and is off when the gate signal G1 is at low level.

The drain of the transistor SW2 is connected to the node ND1, and the source of the transistor SW2 is connected to the ground. The node ND1 is a node provided in the regulator circuit 30 with the discharge function. The transistor SW2 is turned on when power failure is sensed, and a current for discharging the interphase capacitor $C_X$ and a current for discharging the main capacitor $C_{IN}$ pass between the drain and the source of the transistor SW2 via the node ND1 (details will be given later). The signal fed to the gate of the transistor SW2 is referred to as the gate signal G2. The gate signal G2 is fed from a control logic circuit 150, described later, to the gate of the transistor SW2. The transistor SW2 is on when the gate signal G2 is at high level, and is off when the gate signal G2 is at low level.

The regulator circuit 30 with the discharge function is connected to the terminals TM1, TM2, and TM5. Outside the semiconductor device 1, the terminal TM5 is connected via the capacitor $C_{VCC}$ to the ground. The voltage at the terminal TM5 is referred to as the internal supply voltage $V_{CC}$. The regulator circuit 30 generates the internal supply voltage $V_{CC}$ based on the voltage $V_{IN}$ applied to the terminal TM2. When the regulator circuit 30 generates the internal supply voltage $V_{CC}$, the internal supply voltage $V_{CC}$ has a prescribed voltage value, which is a predetermined positive direct-current voltage value. Here, when the voltage $V_{IN}$ is equal to or lower than a predetermined lower limit voltage $V_{UVLO}$, the regulator circuit 30 suspends generating the internal supply voltage $V_{CC}$, and the internal supply voltage $V_{CC}$ becomes or approaches zero. When the internal supply voltage $V_{CC}$ is generated to have the prescribed voltage value, the circuits in the semiconductor device 1 (including the control circuit 10 and the power failure sense circuit 20) operates based on the internal supply voltage $V_{CC}$. Hereinafter, unless otherwise stated, the internal supply voltage $V_{CC}$ is assumed to have the prescribed voltage value.

The control circuit 10 includes voltage divider circuits 110 and 120, a differential amplifier circuit 130, a Schmitt trigger circuit 140, a control logic circuit 150, a drive circuit 160, and buffer circuits BF1 and BF2.

The voltage divider circuit 110 is composed of a series circuit of a plurality of resistors connected to the terminal TM1 and to the ground and divides the voltage V H. Here, the voltage divider circuit 110 is composed of a series circuit of resistors 111 and 112. The first terminal of the resistor 111 is connected to the terminal TM1, the second terminal of the resistor 111 is connected to the first terminal of the resistor 112, and the second terminal of the resistor 112 is connected to the ground. At the connection node between the resistors 111 and 112 appears a voltage V1', which is a division voltage (a voltage proportional to but lower than the voltage $V_H$) of the voltage $V_H$. The buffer circuit BF1 is a voltage follower that outputs the voltage V1' at a low impedance. That is, the buffer circuit BF1 is composed of an operational amplifier having a non-inverting input terminal for receiving the voltage V1', and the inverting input terminal and the output terminal of the operational amplifier are connected together. From the output terminal of the operational amplifier in the buffer circuit BF1 (hereinafter referred to also as the output terminal of the buffer circuit BF1), the voltage V1 is output. The voltage V1 has the same voltage value as the voltage V1' (an error ignored). The voltages V1 and V1' are voltages (first comparison voltages) resulting from voltage division by the voltage divider circuit 110.

The voltage divider circuit 120 is composed of a series circuit of a plurality of resistors connected to the terminal TM3 and to the ground and divides the voltage $V_D$. Here, the voltage divider circuit 120 is composed of a series circuit of resistors 121 and 122. The first terminal of the resistor 121 is connected to the terminal TM3, the second terminal of the resistor 121 is connected to the first terminal of the resistor 122, and the second terminal of the resistor 122 is connected to the ground. To the connection nodes of the resistors 121 and 122 appears a voltage V2', which is a division voltage (a voltage proportional to but lower than the voltage $V_D$) of the voltage $V_D$. The buffer circuit BF2 is a voltage follower that outputs the voltage V2' at a low impedance. That is, the buffer circuit BF2 is composed of an operational amplifier having a non-inverting input terminal for receiving the voltage V2', and the inverting input terminal and the output terminal of the operational amplifier are connected together. From the output terminal (hereinafter referred to also as the output terminal of the buffer circuit BF2) of the operational amplifier in the buffer circuit BF2, the voltage V2 is output. The voltage V2 has the same voltage value as the voltage V2' (an error ignored). The voltages V2 and V2' are voltages (second comparison voltages) resulting from voltage division by the voltage divider circuit 120.

The differential amplifier circuit 130 is connected to the output terminals of the buffer circuits BF1 and BF2 to receives the voltages V1 and V2. The differential amplifier circuit 130 amplifies the difference between the voltages V1 and V2 and outputs a differential signal $S_{DIF}$ commensurate with the difference between the voltages V1 and V2. Specifically, the differential amplifier circuit 130 includes an operational amplifier 131 and resistors 132 to 135. The first terminal of the resistor 132 is connected to the output terminal of the buffer circuit BF1 to receive the voltage V1. The second terminal of the resistor 132 is connected to the non-inverting input terminal of the operational amplifier 131 and is connected also to the ground via the resistor 133. The first terminal of the resistor 134 is connected to the output terminal of the buffer circuit BF2 to receive the voltage V2. The second terminal of the resistor 134 is connected to the inverting input terminal of the operational amplifier 131 and is also connected to the output terminal of the operational amplifier 131 via the resistor 135. From the output terminal of the operational amplifier 131, the differential signal $S_{DIF}$ is output.

The potential of the differential signal $S_{DIF}$, under the condition that the voltage V2 is constant, increases as the voltage V1 increases and decreases as the voltage V1 decreases. The potential of the differential signal $S_{DIF}$, under the condition that the voltage V1 is constant, decreases as the voltage V2 increases and increases as the voltage V2 decreases.

The Schmitt trigger circuit 140 converts the differential signal $S_{DIF}$, which is an analog signal, into a digital signal $S_{SMT}$ with hysteresis, and outputs the digital signal $S_{SMT}$. The signal $S_{SMT}$ has either a high or a low signal level. The operation of the circuit 140 will be described starting at a time point when the signal $S_{SMT}$ is at low level. If the potential of the differential signal S DIF shifts from a level lower than a predetermined upper threshold voltage VH_SMT to a level higher than the upper threshold voltage VH_SMT, the circuit 140 switches the signal $S_{SMT}$ from low level to high level. Then, if the potential of the differential signal $S_{DIF}$ shifts from a level higher than a predetermined lower threshold voltage VL_SMT to a level lower than the lower threshold voltage VL_SMT, the circuit 140 switches the signal $S_{SMT}$ from high level to low level. Here, the upper threshold voltage VH_SMT is higher than the lower threshold voltage VL_SMT, and the lower threshold voltage VL_SMT is positive.

The control logic circuit 150 receives the signal S SMT from the Schmitt trigger circuit 140 and a power failure sense signal $S_{FE}$ from the power failure sense circuit 20. The power failure sense signal $S_{FE}$ and a control signal $s_{CNT}$, described later, are binary signals that take the value of either "1" or "0". In a steady state where the alternating-current voltage $V_{AC}$ is stably supplied to the power supply apparatus AA, the power failure sense signal $S_{FE}$ is kept at the value "0". During the period in which the power failure sense signal $S_{FE}$ has the value "0", the control logic circuit 150 feeds a low-level gate signal G2 to the transistor SW2 to keep the transistor SW2 off and, in addition, feeds a control signal $S_{CNT}$ based on the signal $S_{SMT}$ to the drive circuit 160 to turn on and off the transistor SW1. The drive circuit 160 is connected to the gate of the transistor SW1 and feeds the gate signal G1 to the transistor SW1 in accordance with the control signal $S_{CNT}$ to turn on and off the transistor SW1.

Specifically, during the period in which the power failure sense signal $S_{FE}$ has the value "0", when the signal $S_{SMT}$ is at high level, the control logic circuit 150 feeds the control signal $S_{CNT}$ with the value "0" to the drive circuit 160. Receiving the control signal $S_{CNT}$ with the value "0", the drive circuit 160 feeds a low-level gate signal G1 to the transistor SW1 and thereby makes the transistor SW1 off. During the period in which the power failure sense signal $S_{FE}$ has the value "0", when the signal $S_{SMT}$ is at low level, the control logic circuit 150 feeds the control signal $S_{CNT}$ with the value "1" to the drive circuit 160. Receiving the control signal $S_{CNT}$ with the value "1", the drive circuit 160 feeds a high-level gate signal G1 to the transistor SW1 and thereby makes the transistor SW1 on.

The power failure sense circuit 20 senses power failure (more specifically, checks for and senses occurrence of power failure) based on the voltage $V_H$ at the terminal TM1. In the configuration example shown in FIG. 1, the voltage V1, which is commensurate with the voltage $V_H$, is fed to the power failure sense circuit 20, and the power failure sense circuit 20 senses power failure (more specifically, checks for and senses occurrence of power failure) based on the voltage V1. A signal indicating the result of sensing by the power failure sense circuit 20 is, as the power failure sense signal $S_{FE}$, output from the power failure sense circuit 20 to the control logic circuit 150. The power failure sense signal $S_{FE}$ with the value "1" is an asserted signal (valid signal) indicating that power failure is occurring. The power failure sense signal $S_{FE}$ with the value "0" is a negated signal (invalid signal) and it does not indicate that power failure is occurring or it indicates that no power failure is occurring.

The voltage $V_H$ is a full-wave rectification voltage of the alternating-current voltage $V_{AC}$; thus, during the supply period of the alternating-current voltage $V_{AC}$, as the voltage $V_H$ varies also the voltage V1 varies. Here, the period of change of the voltages $V_H$ and V1 equals the half period of the alternating-current voltage V Ac. Using this relationship, the power failure sense circuit 20 senses occurrence of power failure based on how the voltage $V_H$ varies (in practice, it senses occurrence of power failure based on how the voltage V1 varies). In the power failure sense circuit 20, the period in which the power failure sense signal $S_{FE}$ is set at the value "1" (that is, a period in which occurrence of power failure is being sensed) is referred to as a power failure sense period. In the power failure sense circuit 20, the period in which the power failure sense signal $S_{FE}$ is set at the value "0" (that is, a period in which occurrence of power failure is not being sensed) is referred to as a power failure non-sense period. Except for a transition period when the supply period of the alternating-current voltage $V_{AC}$ and the non-supply period of the alternating-current voltage $V_{AC}$ switch, the supply period of the alternating-current voltage $V_{AC}$ coincides with the power failure non-sense period (that is, in the supply period of the alternating-current voltage $V_{AC}$, the power failure sense signal $S_{FE}$ is "0"), and the power failure sense period coincides with the non-supply period of the alternating-current voltage $V_{AC}$ (that is, in the non-supply period of the alternating-current voltage $V_{AC}$, the power failure sense signal $S_{FE}$ is "1").

Figure 2:
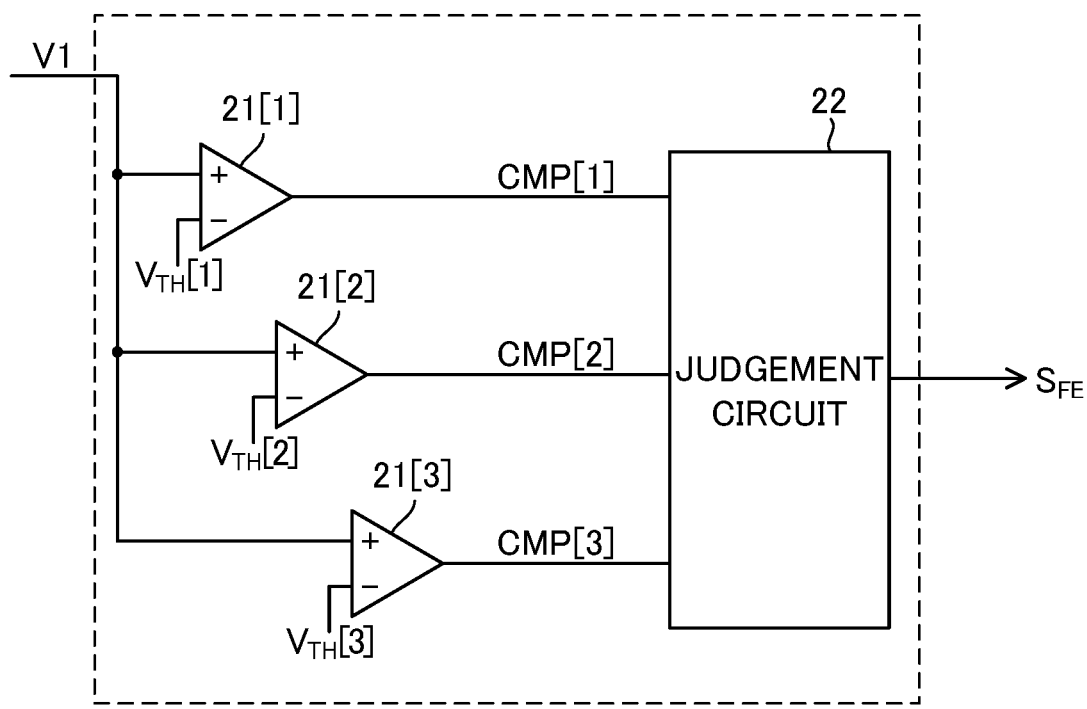
FIG. 2 is a configuration diagram of a power failure sense circuit according to the embodiment of the present disclosure.

FIG. 2 shows an example of an internal configuration of the power failure sense circuit 20. The power failure sense circuit 20 includes two or more comparators 21 and a judgement circuit 22 that receives the output signals of the comparators 21. The power failure sense circuit 20 shown in FIG. 2 includes, as three comparators 21, comparators 21[1] to 21[3]. The non-inverting input terminals of the comparators 21[1] to 21[3] are fed with the voltage V1. The inverting input terminals of the comparators 21[1] to 21[3] are fed with predetermined judgement voltages $V_{TH}[1]$ to $V_{TH}[3]$ respectively. Here, "$V_{TH}[1]>V_{TH}[2]>V_{TH}[3]>0$" holds. For any integer i, the comparator 21[i] compares the voltage V1 with the judgement voltage $V_{TH}[i]$ and outputs a high-level signal CMP[i] when the voltage V1 is higher than the judgement voltage $V_{TH}[i]$ and outputs a low-level signal CMP [i] when the voltage V1 is lower than the judgement voltage $V_{TH}[i]$. When the voltage V1 and the judgement voltage $V_{TH}[i]$ are just equal, the output signal CMP[i] of the comparator 21[i] is at high or low level.

Figure 3:
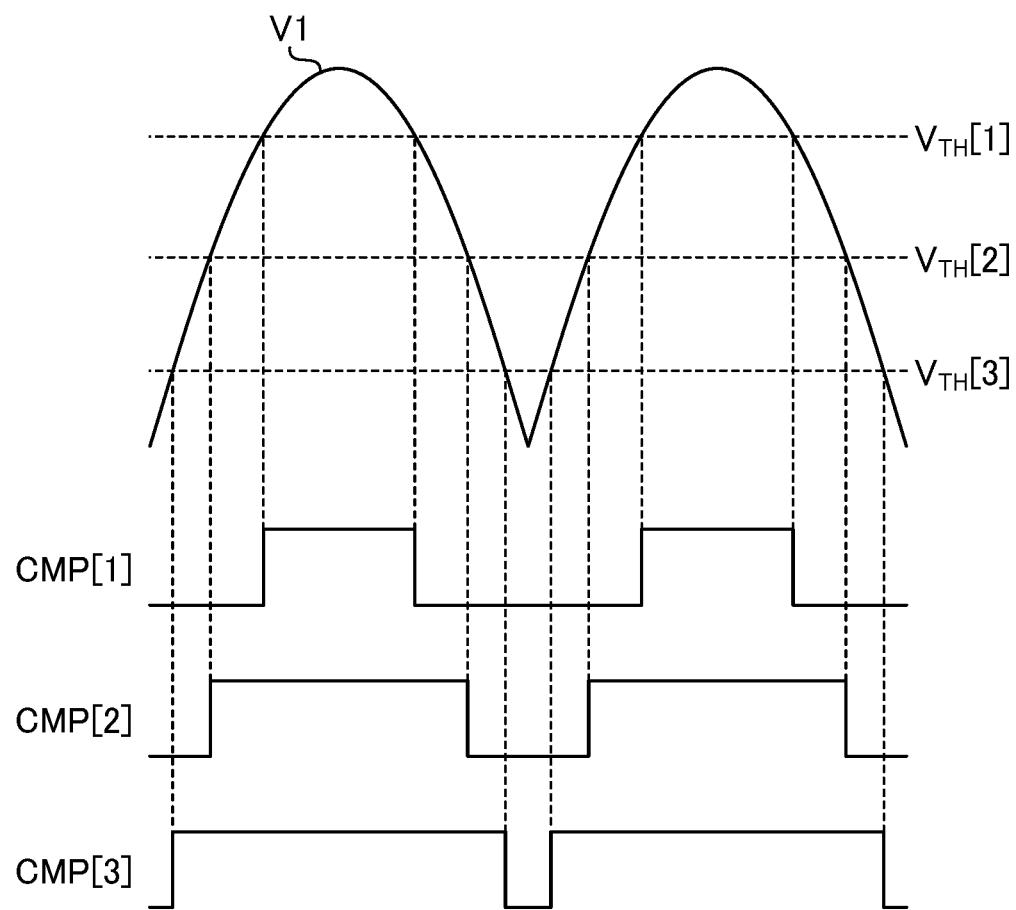
FIG. 3 is a diagram illustrating the operation of the power failure sense circuit according to the embodiment of the present disclosure.

The judgement circuit 22 generates and outputs the power failure sense signal $S_{FE}$ based on the output signals of the comparators 21[1] to 21[3]. Depending on the magnitude of the alternating-current voltage $V_{AC}$, the parasitic capacitance between the terminal TH1 and the ground, and the like, during the supply period of the alternating-current voltage $V_{AC}$, one or more of a first to a third output toggle occur. FIG. 3 shows a case where all the first to third output toggles occur. For any integer i, the i-th output toggle means that, during a half period of the alternating-current voltage $V_{AC}$, one up edge and one down edge occur once in the output signal CMP[i] of the comparator 21[i].

The judgement circuit 22 monitors occurrence of the first to third output toggles based on the output signals of the comparators 21[1] to 21[3]. If, during a predetermined judgement time $t_{TH}$, one or more of the first to third output toggles occur, the judgement circuit 22 sets the value of the power failure sense signal $S_{FE}$ to "0". If none of the first to third output toggles occur for a predetermined judgement time $t_{TH}$ or longer, the judgement circuit 22 judges that power failure has occurred and sets the value of the power failure sense signal $S_{FE}$ to "1".

The judgement time $t_{TH}$ has a length of time equal to or longer than the half period of the alternating-current voltage $V_{AC}$. Here, in the semiconductor device 1, the half period of the alternating-current voltage $V_{AC}$ is assumed to be known. The half period of the alternating-current voltage $V_{AC}$ refers to one half of the period of the alternating-current voltage $V_{AC}$. If the frequency of the alternating-current voltage $V_{AC}$ is within a predetermined frequency range, the judgement time $t_{TH}$ is set based on the minimum frequency (for example, 50 Hz) of the frequency range. That is, the judgement time $t_{TH}$ can be given a length of time equal to or longer than one-half of the reciprocal of the minimum frequency (for example, 50 Hz) mentioned above. The initial value of the power failure sense signal $S_{FE}$ is assumed to be "0". Even after the power failure sense signal $S_{FE}$ is set to the value "1", if the first, second, or third output toggle is detected, the judgement circuit 22 switches the power failure sense signal $S_{FE}$ back to the value "0".

When power failure is sensed, the control logic circuit 150 performs discharge operation for discharging the capacitors $C_X$ and $C_{IN}$.

Before a description of the discharge operation, the operation of the control circuit 10 in a steady state will be described. First, in an initial state of the control circuit 10, it is assumed that the signal $S_{SMT}$ is at low level and that the transistor SW1 is on. Here, the voltage $V_D$ has substantially the ground potential.

First, consider a first situation where the magnitude of the alternating-current voltage $V_{AC}$ is sufficiently low. In the first situation, even when the transistor SW1 is kept on during the supply period of the alternating-current voltage $V_{AC}$, although "V1>V2" the difference between the voltages V1 and V2 do not become so large. As a result, the differential signal $S_{DIF}$ does not become higher than the upper threshold voltage VH_SMT of the Schmitt trigger circuit 140 and the signal $S_{SMT}$ is kept at low level. Thus, the transistor SW1 is always kept on. Here, the magnitude of the alternating-current voltage $V_{AC}$ being sufficiently low means that the magnitude of the alternating-current voltage $V_{AC}$ is so low that, even if the transistor SW1 is kept on in the supply period of the alternating-current voltage $V_{AC}$, the capacitor voltage $V_{CIN}$ is kept at the predetermined limit voltage $V_{LIM}$ or lower.

Figure 4:
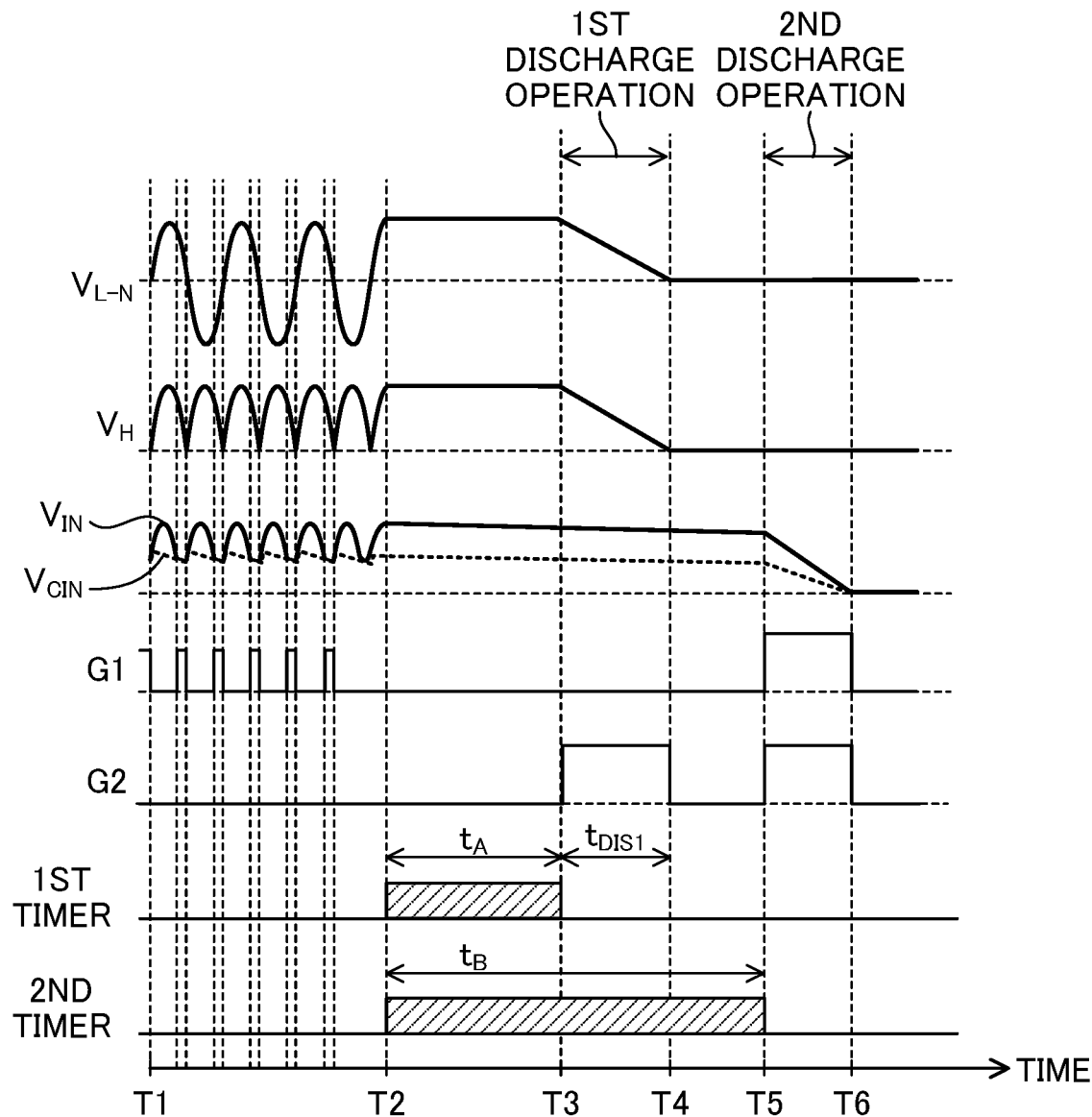
FIG. 4 is a diagram showing voltages, signal waveforms, and the like at relevant points in the power supply apparatus according to the embodiment of the present disclosure before and after occurrence of power failure.

Next, a second situation will be considered. In the second situation, the magnitude of the alternating-current voltage $V_{AC}$ is so high that, if the transistor SW1 is kept on in the supply period of the alternating-current voltage $V_{AC}$, the capacitor voltage $W_{IN}$ rises above the predetermined limit voltage $V_{LIM}$ For example, in the second situation, the effective voltage value of the alternating-current voltage $V_{AC}$ is 240 V. See FIG. 4. FIG. 4 shows voltage waveforms and the like in the second situation. FIG. 4 shows, in order from top down, the waveforms of a voltage $V_{L-N}$, a voltage $V_H$, a voltage $V_{IN}$, a voltage $V_{CIN}$, the gate signal G1, and the gate signal G2. Of these waveforms, only the waveform of the capacitor voltage $V_{CIN}$ is indicated by a broken line, and the other waveforms are indicated by solid lines. The voltage $V_{L-N}$ represents the potential at the input terminal $TM_L$ relative to the potential at the input terminal $TM_N$. In FIG. 4, under the waveform of the gate signal G2, the operation of a first timer and a second timer is illustrated. The function of those timers will be described later.

It is assumed that, as time passes, time points T1, T2, T3, T4, T5, and T6 occur in this order. From before time point T1 until immediately before time point T2, the alternating-current voltage $V_{AC}$ as observed in the second situation is fed to the power supply apparatus AA (that is, fed to between the input terminal $TM_L$ and $TM_N$). Until immediately before time point T2, the power failure sense signal $S_{FE}$ is kept at the value "0". As a result, the gate signal G2 is kept at low level.

The operation between time points T1 and T2 will be described starting at a state where the signal $S_{SMT}$ is at low level (that is, a state where the gate signal G1 is at high level and the transistor SW1 is on). During the on-period of the transistor SW1, as the voltage $V_H$ increases, the differential signal $S_{DIF}$ increases. In the second situation, as the voltage $V_H$ increases during the on-period of the transistor SW1, the potential of the differential signal $S_{DIF}$ rises above the upper threshold voltage VH_SMT of the Schmitt trigger circuit 140 and an up edge occurs in the signal $S_{SMT}$. As a result, a down edge occurs in the gate signal G1 and the transistor SW1 turns off.

While the voltage $V_H$ is increasing, also the voltage $V_{IN}$ increases, and, if the transistor SW1 is off, also the voltage $V_D$ increases as the voltage $V_{IN}$ increases. Meanwhile, since the voltage $V_H$ increases, the differential signal $S_{DIF}$ is kept at a comparatively high level, and the signal $S_{SMT}$ is kept at high level. Then, with the transistor SW1 off, the direction of the change of the voltage $V_H$ switches from increasing to decreasing. As, with the transistor SW1 off, the voltage $V_H$ decreases, also the voltage $V_{DT}$ decreases, but the voltage $V_{IN}$ does not decrease down to the capacitor voltage $V_{CIN}$ or below. While, with the transistor SW1 off, the voltage $V_H$ is decreasing, the differential signal $S_{DIF}$ decreases as the voltage V1 decreases. Then, when the potential of the differential signal $S_{DIF}$ falls below the lower threshold voltage VL_SMT, a down edge occurs in the signal $S_{SMT}$ and an up edge occurs in the gate signal G1. As a result, the transistor SW1 turns on. Then, the direction of the change of the voltage V H switches from decreasing to increasing, and thereafter operation similar to what has been described above is repeated. In this way, in the supply period of the alternating-current voltage $V_{AC}$, the capacitor voltage $V_{CIN}$ is kept equal to or lower than the predetermined limit voltage $V_{LIM}$, around the limit voltage $V_{LIM}$.

In an example shown in FIG. 4, at time point T2, a shift takes place from the supply period of the alternating-current voltage $V_{AC}$ to the non-supply period of the alternating-current voltage $V_{AC}$. Thus, at time point T2, the power failure sense circuit 20 senses occurrence of power failure, and the value of the power failure sense signal $S_{FE}$ changes from "0" to "1". Sensing occurrence of power failure requires a given time; thus, in practice, when the given period has passed after a shift from the supply period of the alternating-current voltage $V_{AC}$ to the non-supply period of the alternating-current voltage $V_{AC}$, the value of the power failure sense signal $S_{FE}$ changes from "0" to "1". However, here, for convenience of explanation, the value of the power failure sense signal $S_{FE}$ is regarded as changing from "0" to "1" at time point T2.

In response to the value of the power failure sense signal $S_{FE}$ changing from "0" to "1", the control logic circuit 150 starts up a first timer and a second timer that it includes or controls. The first timer counts a first wait time $t_A$, and the second timer counts the second wait time $t_B$. The second wait time $t_B$ is longer than the first wait time $t_A$. The first timer counts the elapsed time after a reference time point and, when the elapsed time after the reference time point reaches the first wait time $t_A$, outputs a first timer active signal. The second timer counts the elapsed time after a reference time point and, when the elapsed time after the reference time point reaches the second wait time $t_B$, outputs a second timer active signal. The reference time point is a time point at which the value of the power failure sense signal $S_{FE}$ changes from "0" to "1", and in the example in FIG. 4, it is time point T2.

In the example in FIG. 4, time point T3 is a time point that is later than time point T2 by the first wait time $t_A$, and time point T5 is a time point that is later than time point T2 by the second wait time $t_B$. Thus, the first timer active signal appears at time point T3, and the second timer active signal appears at time point T5. In the example in FIG. 4, it is assumed that, after time point T2, power failure continues beyond time point T6. Thus, so long as the semiconductor device 1 continues to operate, the power failure sense signal $S_{FE}$ is kept at the value "1" even after time point T2.

On receiving the first timer active signal, the control logic circuit 150 performs first discharge operation and, on receiving the second timer active signal, performs second discharge operation. In the example in FIG. 4, the first discharge operation is performed between time points T3 and T4, and the second discharge operation is performed between time points T5 and T6.

In the first discharge operation, the control logic circuit 150 keeps the control signal $S_{CNT}$ at the value "0" to keep the gate signal G1 at low level (that is, to keep the transistor SW1 off). In the first discharge operation, the control logic circuit 150 keeps the gate signal G2 at high level to keep the transistor SW2 on. Thus, in the example in FIG. 4, between time points T3 and T4, the transistor SW1 is kept off and the transistor SW2 is kept on.

In a modified version of the example in FIG. 4, if, after time point T2, before the first timer active signal is output, the supply of the alternating-current voltage $V_{AC}$ to the power supply apparatus AA recovers and the value of the power failure sense signal $S_{FE}$ returns from "1" to "0", the control logic circuit 150 does not perform the first discharge operation. In this case, after the value of the power failure sense signal $S_{FE}$ returns to "0", operation similar to that before time point T2 is performed.

As described above, after the value of the power failure sense signal $S_{FE}$ has switched from "0" to "1", when the first wait time t A passes with the value of the power failure sense signal $S_{FE}$ kept at "1", the control logic circuit 150 performs the first discharge operation. In practice, even if no power failure is occurring, the power failure sense signal $S_{FE}$ can have the value "1" momentarily due to noise or the like. By securing the first wait time $t_A$, it is possible to prevent the first discharge operation being performed based on such erroneous detection.

Figure 5:
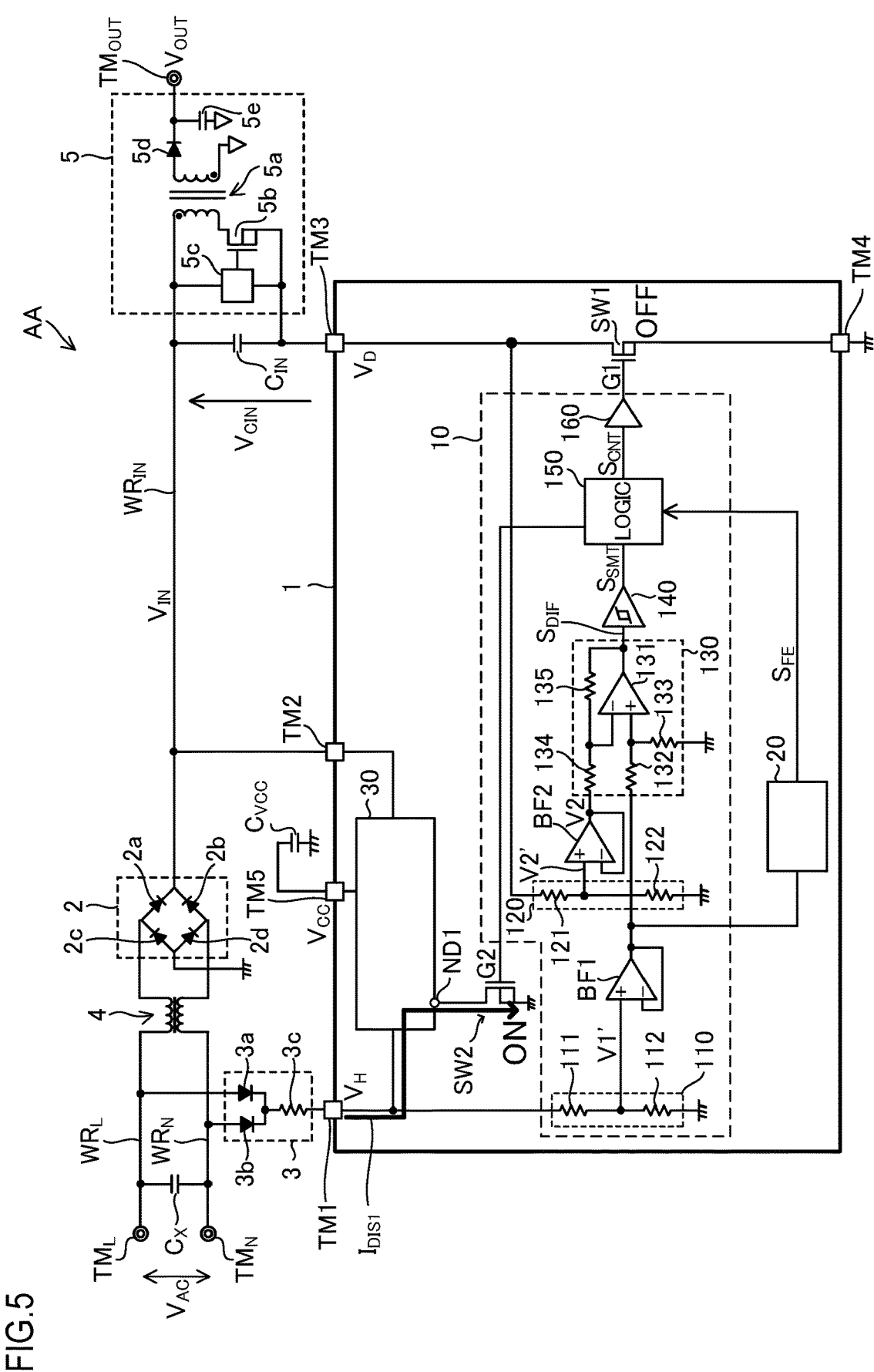
FIG. 5 is a diagram showing the flow of a discharge current in first discharge operation according to the embodiment of the present disclosure.

Through the first discharge operation, the interphase capacitor $C_X$ is discharged. FIG. 5 shows how the interphase capacitor $C_X$ is discharged through the first discharge operation. In FIG. 5, a current $I_{DIS1}$ represents the discharge current from the interphase capacitor $C_X$ in the first discharge operation. In the first discharge operation, the interphase capacitor $C_X$ is discharged (that is, the discharge current $I_{DIS1}$ passes) through a first discharging path that runs across the full-wave rectifier circuit 3, the terminal TM1, and the switching element SW2. The first discharging path includes the ground, and, through the first discharge operation, the potentials of both terminals of the interphase capacitor $C_X$ approach the ground potential.

The first discharge operation is performed only for a predetermined discharge time $t_{DIS1}$. That is, the time point later than time point T3 by the discharge time $t_{DIS1}$ is time point T4. Here, it is assumed that the discharge time $t_{DIS1}$ is a prescribed fixed time. The discharge time tip's I can be determined so as to ensure that, through the first discharge operation for the discharge time $t_{DIS1}$, the voltage across the interphase capacitor $C_X$ becomes sufficiently low. In the example in FIG. 4, the second wait time $t_B$ is longer than the sum of the first wait time $t_A$ and the discharge time $t_{DIS1}$. Thus, time point T5 occurs later than time point T4.

A load that operates based on the output voltage $V_{OUT}$ (not shown; a microcomputer or the like) is connected to the output terminal $TM_{OUT}$. After occurrence of power failure, before the supply of the output voltage \Tour is cut off, the load performs necessary outage-handling operation. An interval is left after time point T4 before the start of the second discharge operation so that the necessary output voltage \Tom' is supplied until the outage-handling operation is finished. The semiconductor device 1 may, at time point T3 or T4, transmit to the load a signal indicating that power failure has occurred. In this case, on receiving the signal, the load can start the outage-handling operation.

Or, the times $t_B$, $t_A$ and $t_{DIS1}$ may be set in advance such that the second wait time t B equals the sum of the first wait time t A and the discharge time $t_{DIS1}$. In this case, time points T5 and T4 coincide. In any case, the second discharge operation is performed after the first discharge operation.

In the second discharge operation, the control logic circuit 150 keeps the control signal $S_{CNT}$ at the value "1" to keep the gate signal G1 at high level (that is, to keep the transistor SW1 on). In the second discharge operation, the control logic circuit 150 keeps the gate signal G2 at high level to keep the transistor SW2 on. Thus, in the example in FIG. 4, between time points T5 and T6, the transistors SW1 and SW2 are both kept on.

Figure 6:
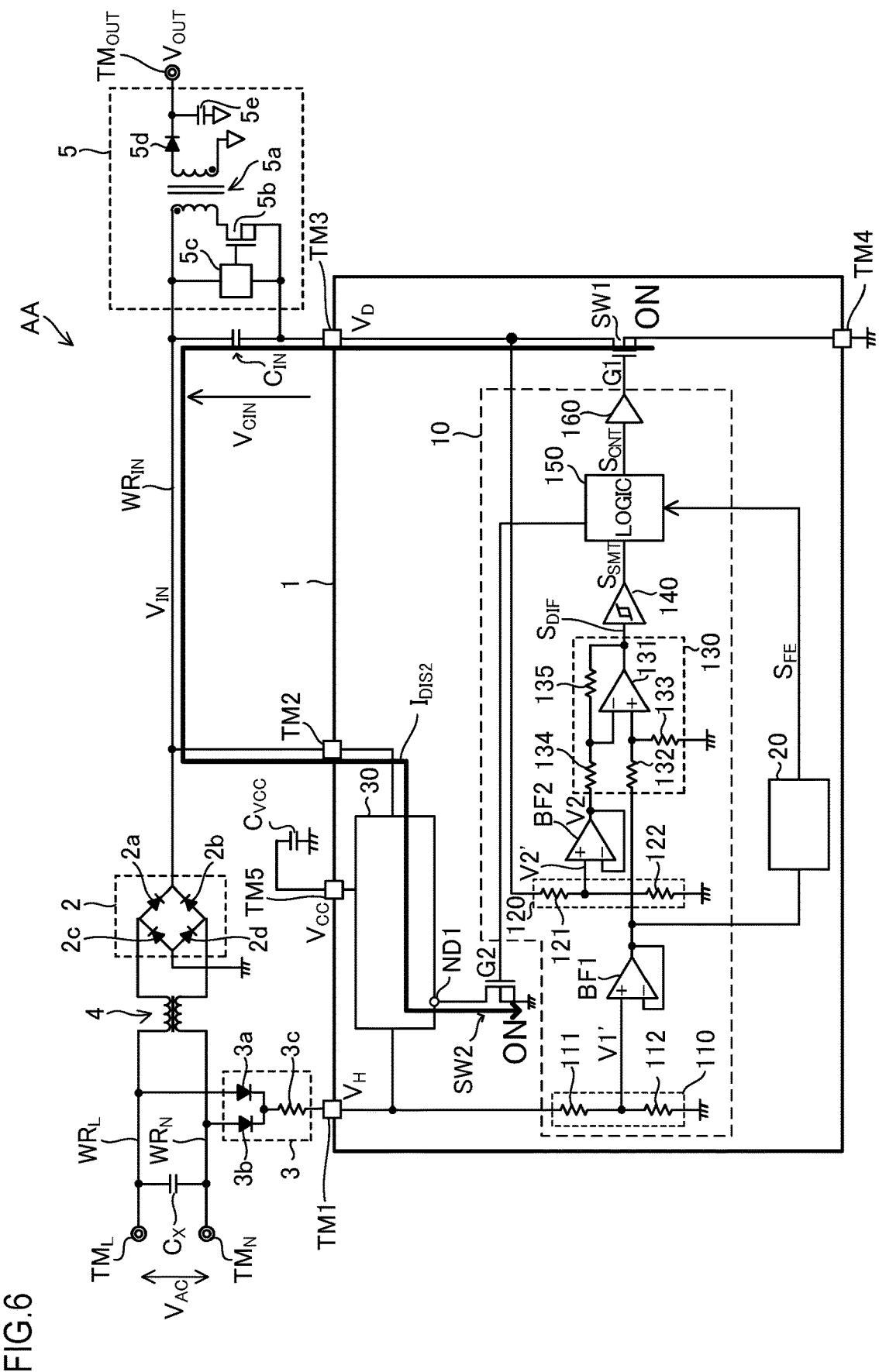
FIG. 6 is a diagram showing the flow of a discharge current in second discharge operation according to the embodiment of the present disclosure.

Through the second discharge operation, the main capacitor CIN is discharged. FIG. 6 shows how the main capacitor $C_{IN}$ is discharged through the second discharge operation. In FIG. 6, a current $I_{DIS2}$ represents the discharge current from the main capacitor $C_{IN}$ in the second discharge operation. In the second discharge operation, the main capacitor $C_{IN}$ is discharged (that is, the discharge current $I_{DIS2}$ passes) through a second discharging path that runs across the switching element SW1, the terminal TM3, the terminal TM2, and the switching element SW2. The second discharging path includes the ground, and, through the second discharge operation, the potentials of both terminals of the main capacitor $C_{IN}$ approach the ground potential.

After time point T5, the voltages $V_{IN}$ and $V_{CIN}$ decrease. When the voltage $V_{IN}$ decreases down to the above-mentioned lower limit voltage $V_{UVLO}$ or below, a reset signal appears in the semiconductor device 1. On receiving the reset signal, the control circuit 10 performs reset operation. In the reset operation, the control circuit 10 (through coordinated operation of the control logic circuit 150 and the drive circuit 160) switches the gate signals G1 and G2 both to low level. Time point T6 is a time point at which a reset signal appears, and it corresponds to the end time point of the second discharge operation. At time point T6, the transistors SW1 and SW2 both turn off, and thereby the second discharge operation ends.

Here, the switching control device 5c continues the switching of the power transistor after time point T5 until the capacitor voltage $W_{IN}$ becomes equal to or lower than the operation lower limit voltage of the switching control device 5c. If the capacitor voltage $V_{CIN}$ falls to or below the operation lower limit voltage, the operation of the switching control device stops. After the operation of the switching control device 5c stops, the power transistor 5b is kept off.

Conventionally, when power failure occurs, it is often difficult to discharge both the interphase capacitor and the main capacitor for reasons such as an increased number of externally fitted components needed. In particular, the main capacitor has a high withstand voltage and this makes it technically difficult to discharge it at the same time as the interphase capacitor. By contrast, with the configuration according to the embodiment, on occurrence of power failure, it is possible to discharge both the interphase capacitor and the main capacitor.

With the configuration shown in FIG. 1, while using the switching element SW1 necessary to reduce the required withstand voltage of the main capacitor $C_{IN}$, only by adding the switching element SW2, it is possible to discharge the interphase capacitor $C_X$ and the main capacitor $C_{IN}$. That is, it is possible to discharge these capacitors with a simple configuration.

Hereinafter, by way of a plurality of practical examples, some specific examples will be described along with applied technologies, modified technologies, and the like. Unless otherwise stated or unless inconsistent, any features described above in connection with the embodiment apply to the practical examples described below. For any features of the practical examples that contradict what has been described above, their description given in connection with the practical examples may prevail. Unless inconsistent, any features of any of the plurality of practical examples can be applied to any other practical example (that is, any two or more of the plurality of practical examples can be implemented in any combination).

First Practical Example

A first practical example will be described. The discharge time $t_{DIS1}$ may be, instead of a fixed time, a time that dynamically changes based on the voltage $V_H$ after the start of the first discharge operation. Specifically, a configuration as described below is also possible.

Figure 7:
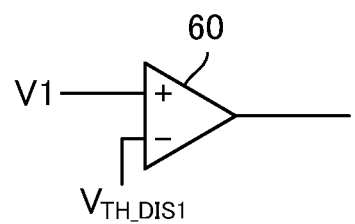
FIG. 7 is a diagram showing a comparator used for determining the end timing of the first discharge operation according to a first practical example belonging to the embodiment of the present disclosure.

A comparator 60 that compares the voltage V1 with a predetermined end judgement voltage $V_{TH\_DIS1}$ as shown in FIG. 7 is included in the semiconductor device 1. The non-inverting input terminal of the comparator 60 is fed with the voltage V1, and the inverting input terminal of the comparator 60 is fed with the end judgement voltage $V_{TH\_DIS1}$. The end judgement voltage $V_{TH\_DIS1}$ has a predetermined positive voltage value (reference value). The comparator 60 may be the comparator 21[3] in FIG. 2. In this case, the end judgement voltage $V_{TH\_DIS1}$ equals the judgement voltage $V_{TH}[3]$ mentioned above.

The comparator 60 outputs a high-level signal when the voltage V1 is higher than the end judgement voltage $V_{TH\_DIS1}$, and outputs a low-level signal when the voltage V1 is lower than the end judgement voltage $V_{TH\_DIS1}$. When "V1=$V_{TH\_DIS1}$", the output signal of the comparator 60 is at high level or low level. The output signal of the comparator 60 is fed to the control logic circuit 150.

The control logic circuit 150 according to the first practical example, after the start of the first discharge operation, monitors the output signal of the comparator 60 and, in response to a transition of the output signal of the comparator 60 from high level to low level (that is, in response to the divided value of the voltage $V_H$ becoming lower than the reference value), ends the first discharge operation. Thus, in the first practical example, the discharge time $t_{DIS1}$ can vary greatly depending on the voltage $V_H$ at time point T3 and the like.

Here, an upper limit may be set to the duration of the first discharge operation (that is, the discharge time $t_{DIS1}$) regardless of the output signal of the comparator 60 such that "$(t_A+t_{DIS1})<t\,B$" always holds, that is, such that the second wait time $t_B$ is longer than the sum of the first wait time t A and the discharge time $t_{DIS1}$. Or, the second wait time t B may be set sufficiently long regardless of the voltage $V_H$ at time point T3 such that "$(t_A+t_{DIS1})<t_B$" always holds. In any case, after the first discharge operation ends, the second discharge operation is started. The operation after the start of the second discharge operation is as described above.

Second Practical Example

Figure 8:
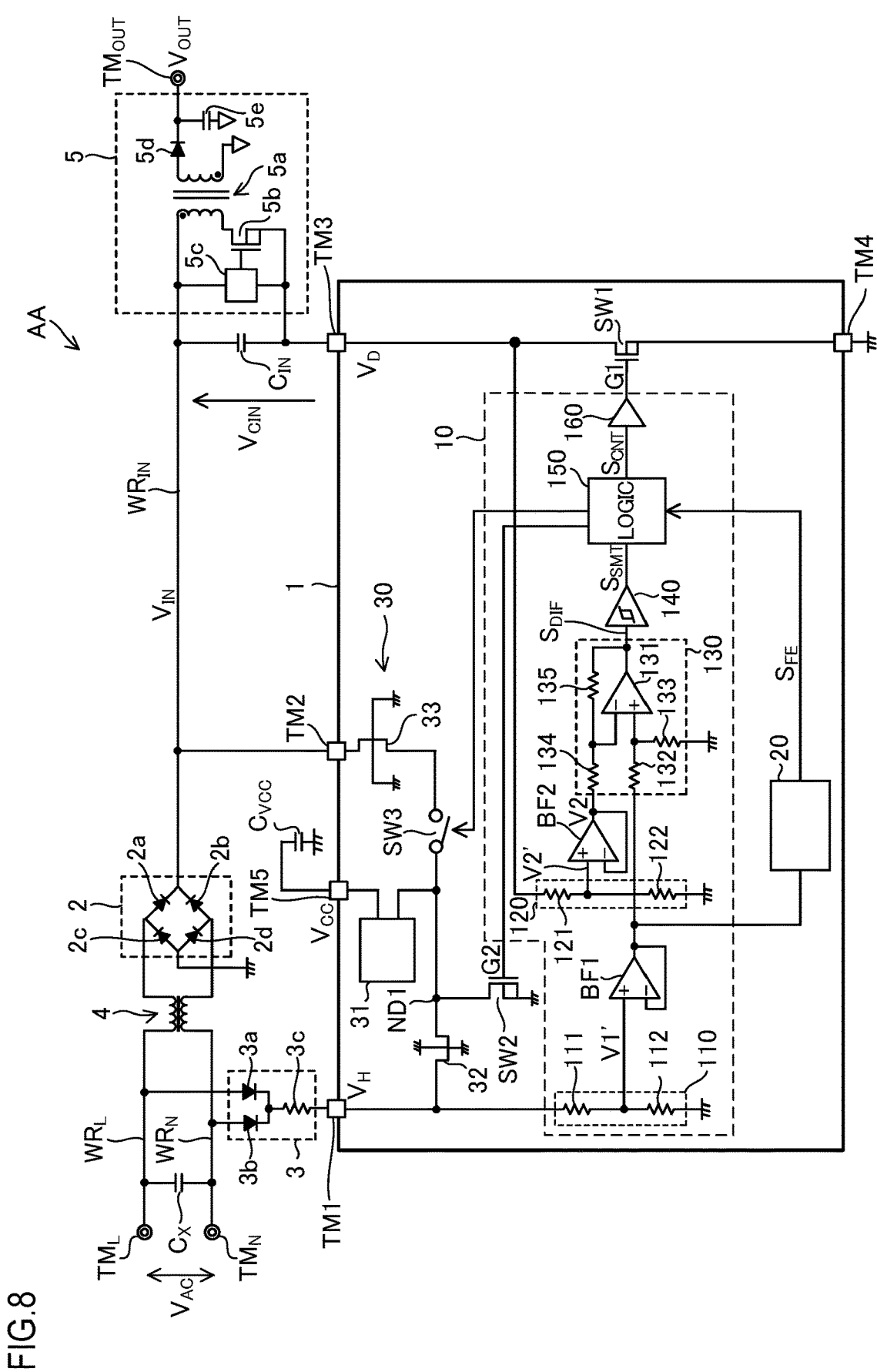
FIG. 8 is a configuration diagram of a power supply apparatus according to a second practical example belonging to the embodiment of the present disclosure.

A second practical example will be described. The second practical example deals with an example of the internal configuration of the regulator circuit 30 with the discharge function. FIG. 8 is a configuration diagram of the power supply apparatus AA according to the second practical example. The regulator circuit 30 according to the second practical example includes an internal regulator 31, transistors 32 and 33, and a switching element SW3.

The transistors 32 and 33 are n-channel JFETs (junction field-effect transistors). The transistors 32 and 33 are normally-on field-effect transistors, that is, transistors of which the drain-source channel conducts even when the gate-source voltage is 0 V.

The drain of the transistor 32 is connected to the terminal TM1, and the source of the transistor 32 is connected to the node ND1. The gate and the back gate of the transistor 32 are connected to the ground. The drain of the transistor 33 is connected to the terminal TM2, and the source of the transistor 33 is connected to the first terminal of the switching element SW3. The gate and the back gate of the transistor 33 are connected to the ground. The second terminal of the switching element SW3 is connected to the node ND1. The control logic circuit 150 turns on and off the switching element SW3. As described above, the node ND1 is connected to the drain of the transistor SW2, and the source of the transistor SW2 is connected to the ground.

The internal regulator 31 generates the internal supply voltage $V_{CC}$ based on the voltage at the node ND1. The internal supply voltage $V_{CC}$ is fed to the terminal TM5. The switching element SW3 may be configured with any number, one or more, of transistors. For example, the switching element SW3 may be configured with an n-channel MOSFET. In this case, the drain and the source of the MOSFET as the switching element SW3 function as the first terminal and the second terminal of the switching element SW3, and the control logic circuit 150 controls the gate potential of the MOSFET and thereby turns on and off the switching element SW3. Here, the semiconductor device 1 may include a starter circuit that, before the start-up of the control circuit 10, when "$V_{IN}>0$", feeds the voltage at the terminal TM2 to the internal regulator 31 to make the internal regulator 31 generate the internal supply voltage $V_{CC}$.

The control logic circuit 150 keeps the switching element SW3 off only during execution of the first discharge operation and otherwise keeps the switching element SW3 on. Thus, in the example in FIG. 4, the switching element SW3 is on from time point T1 to immediately before time point T3, is off between time points T3 and T4, and is then on to time point T6.

Figure 9:
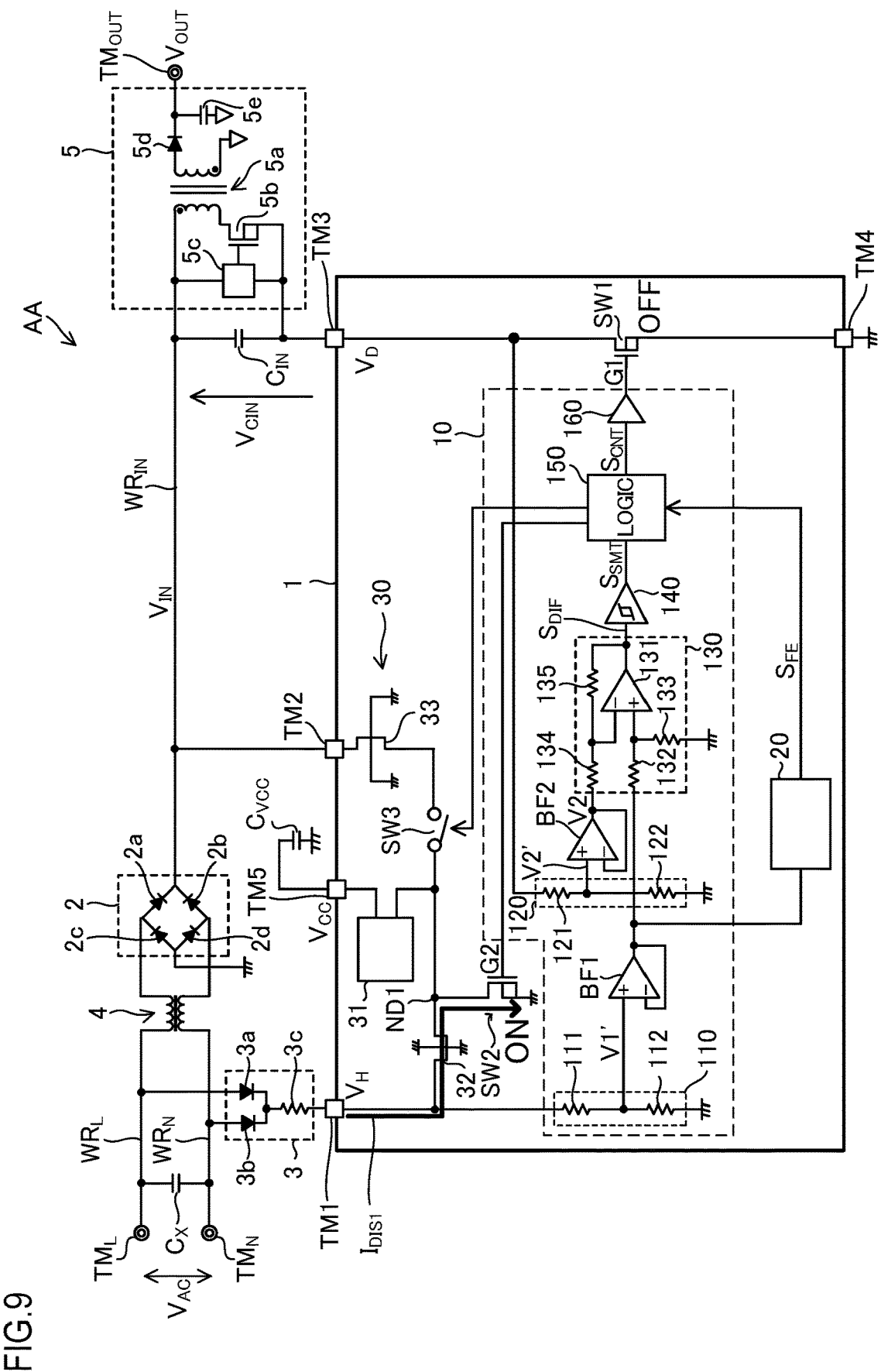
FIG. 9 is a diagram showing the flow of the discharge current in the first discharge operation according to the second practical example belonging to the embodiment of the present disclosure.

FIG. 9 shows how the interphase capacitor $C_X$ is discharged through the first discharge operation. The transistor 32 is a normally-on JFET; thus, when, during execution of the first discharge operation, the switching element SW2 is on, the interphase capacitor $C_X$ is discharged (that is, the discharge current $I_{DIS1}$ passes) through the first discharging path that runs across the full-wave rectifier circuit 3, the terminal TM1, the transistor 32, and the switching element SW2. Here, when the potential of the node ND1 increases as the discharge current $I_{DIS1}$ increases, the transistor 32 acts so as to reduce the current that passes through its channel (between its drain and the source). Thus, it is possible to prevent an excessive discharge current $I_{DIS1}$ in the first discharge operation.

Figure 10:
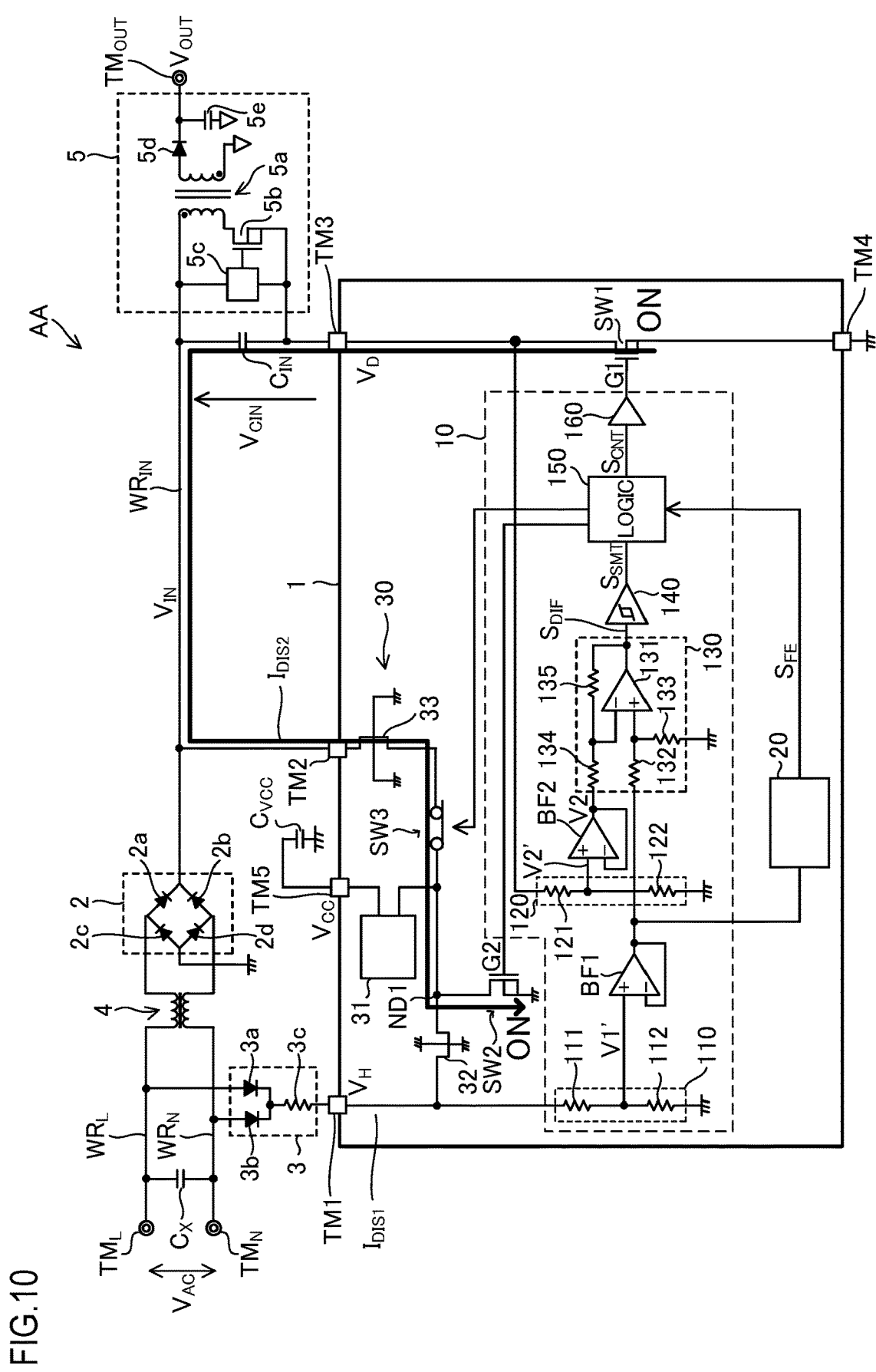
FIG. 10 is a diagram showing the flow of the discharge current in the second discharge operation according to the second practical example belonging to the embodiment of the present disclosure.

FIG. 10 shows how the main capacitor $C_{IN}$ is discharged through the second discharge operation. As will be clear from the above description, during execution of the second discharge operation, the switching element SW3 is on. The transistor 33 is a normally-on JFET; thus, when, during execution of the second discharge operation, the switching elements SW1 and SW2 are on, the main capacitor $C_{IN}$ is discharged (that is, the discharge current $I_{DIS2}$ passes) through the second discharging path that runs across the switching element SW1, the terminals TM3 and TM2, the transistor 33, and the switching elements SW3 and SW2. Here, when the potential of the node ND1 increases as the discharge current $I_{DIS2}$ increases, the transistor 33 acts so as to reduce the current that passes through its channel (between its drain and the source). Thus, it is possible to prevent an excessive discharge current $I_{DIS2}$ in the second discharge operation.

Here, during execution of the first or second discharge operation, the potential at the node ND1 is lower than before the start of the first discharge operation; thus, there is a possibility of the value of the internal supply voltage $V_{CC}$ becoming lower than the prescribed voltage value. To eliminate the possibility, a recharge period may be inserted in the execution period of the first or second discharge operation such that, during the recharge period, the switching element SW3 is on and the transistor SW2 is off. In the recharge period, the charge voltage across the capacitor $C_{VCC}$ is raised up to the prescribed voltage value mentioned above based on the voltage at the node ND1.

Figure 11:
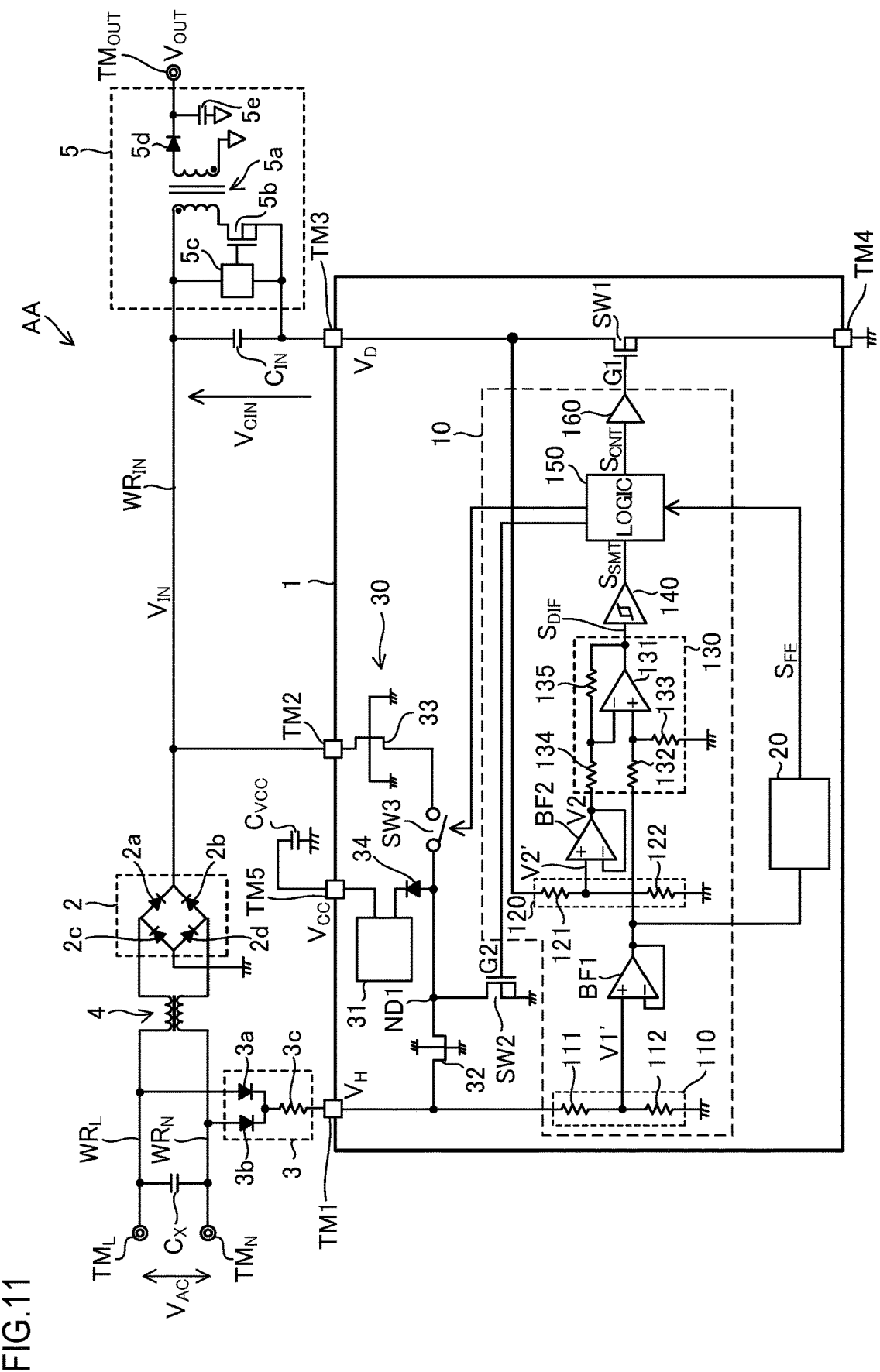
FIG. 11 is a diagram showing a modified configuration of the power supply apparatus according to the second practical example belonging to the embodiment of the present disclosure.

Or, as shown in FIG. 11, a rectifier diode 34 may be added to the regulator circuit 30. The anode of the rectifier diode 34 is connected to the node ND1, and the cathode of the rectifier diode 34 is connected to the input terminal of the internal regulator 31. In the configuration in FIG. 11, the internal regulator 31 generates the internal supply voltage $V_{CC}$ based on the voltage at the cathode of the rectifier diode 34. Or, although not illustrated, a configuration may also be adopted where the internal regulator 31 is connected directly to the terminal TM3. In this case, the internal regulator 31 generates the internal supply voltage $V_{CC}$ based on the voltage at the terminal TM3.

Third Practical Example

A third practical example will be described. The third practical example deals with some modified examples, additional notes, or the like.

For any signal or voltage, the relationship between its high and low levels may be reversed so long as that can be done without departure from what has been described above.

The channel types of the FETs (field-effect transistors) described in the embodiments are merely an example. The channel type of any FET may be changed between the p-channel and n-channel types so long as that can be done without departure from what has been described above.

So long as there is no inconvenience, any transistor described above may be any type of transistor. For example, any transistor described above as the MOSFET may be replaced with a junction field-effect transistor, an IGBT (insulated-gate bipolar transistor), or a bipolar transistor. Any transistor has a first electrode, a second electrode, and a control electrode. In an FET, one of the first and second electrodes is the drain, the other is the source, and the control electrode is the gate. In an IGBT, one of the first and second electrodes is the collector, the other is the emitter, and the control electrode is the gate. In a bipolar transistor that does not belong to the IGBT, one of the first and second electrodes is the collector, the other is the emitter, and the control electrode is the base.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to what is specifically mentioned in connection with the embodiments. The specific values mentioned in the above description are meant merely as examples, and they may be modified to different values.

\<\<Notes\>\>

To follow are notes in connection with the present disclosure of which specific examples of implementation have been described by way of practical examples above.

According to one aspect of what is disclosed herein, a power supply semiconductor device (1) is used in a power supply apparatus (AA) that feeds to a diode bridge (2) an alternating-current voltage ($V_{AC}$) applied to a pair of input terminals ($TM_L$ and $TM_N$) to generate a full-rectified voltage on a target wiring ($WR_{IN}$). The power supply semiconductor device includes: a first input terminal (TM1) configured to receive a rectification voltage ($V_H$) obtained by feeding the alternating-current voltage applied to the pair of input terminals to a full-wave rectifier circuit (3) different from the diode bridge; a second input terminal (TM2) configured to be connected to the target wiring; a potential control terminal (TM3) configured to be connected to the target wiring through a main capacitor ($C_{IN}$); a first switching element (SW1) provided between the potential control terminal and the ground; a power failure sense circuit (20) configured to sense, based on the voltage at the first input terminal, power failure in which the supply of the alternating-current voltage to the pair of input terminals is cut off; a second switching element (SW2) configured to, when power failure is sensed, pass to the ground a current for discharging an interphase capacitor ($C_X$) provided between the pair of input terminals and a current for discharging the main capacitor; and a control circuit (10) configured to control the first and second switching elements. The control circuit, in the supply period of the alternating-current voltage to the pair of input terminals, turns on and off the first switching element based on the voltage at the first input terminal and the voltage at the potential control terminal. The control circuit, when power failure is sensed, performs first discharge operation and then second discharge operation. In the first discharge operation, the first switching element is kept off and the second switching element is kept on so that the interphase capacitor is discharged through a first discharging path (see FIG. 5) that runs across the full-wave rectifier circuit, the first input terminal, and the second switching element. The first discharging path includes the ground. In the second discharge operation, the first and second switching elements are kept on so that the main capacitor is discharged through a second discharging path (see FIG. 6) that runs across the first switching element, the second input terminal, and the second switching element. The second discharging path includes the ground. (A first configuration.)

This makes it possible to, on occurrence of power failure, discharge (with a simple configuration) both the interphase capacitor and the main capacitor.

In the power supply semiconductor device according to the first configuration described above, preferably, the power failure sense circuit senses occurrence of power failure based on how the voltage at the first input terminal varies. The power failure sense circuit may output a power failure sense signal ($S_{FE}$) indicating the result of sensing to the control circuit. During the sense period of power failure, the power failure sense circuit may keep the power failure sense signal in an asserted state. During the non-sense period of power failure, the power failure sense circuit may keep the power failure sense signal in a negated state. After the power failure sense signal switches from the negated state to the asserted state, when a predetermined wait time ($t_A$) passes with the power failure sense signal kept in the asserted state, the control circuit may start the first discharge operation. (A second configuration.)

This helps prevent the interphase capacitor from being discharged in response to erroneous detection of power failure.

In the power supply semiconductor device according to the second configuration described above, preferably, the control circuit, after starting the first discharge operation, performs the first discharge operation only for a predetermined discharge time ($t_{DIS1}$), and then starts the second discharge operation. (A third configuration.)

In the power supply semiconductor device according to the third configuration described above, preferably, the wait time is a first wait time (t A). In performing the second discharge operation after the first discharge operation, the control circuit, after the power failure sense signal switches from the negated state to the asserted state, when a predetermined second wait time ($t_B$) passes, may start the second discharge operation. The second wait time may be equal to or longer than the sum of the first wait time and the discharge time in the first discharge operation. (A fourth configuration.)

This helps ensure the sequence in which, after the discharge operation (first discharge operation) with respect to the interphase capacitor ends, discharge operation (second discharge operation) with respect to the main capacitor is started.

In the power supply semiconductor device according to the second configuration described above (see FIG. 7), preferably, the control circuit, after starting the first discharge operation, in response to the divided value of the voltage at the first input terminal becoming lower than a reference value ($V_{TH\_DIS1}$), ends the first discharge operation, and then starts the second discharge operation. (A fifth configuration.)

This also helps ensure the sequence in which, after the discharge operation (first discharge operation) with respect to the interphase capacitor ends, the discharge operation (second discharge operation) with respect to the main capacitor is started.

In the power supply semiconductor device according to any of the first to fifth configurations described above, preferably, the control circuit operates based on the voltage at the second input terminal. The control circuit, after starting the second discharge operation, may end the second discharge operation when the voltage at the second input terminal becomes equal to or lower than a predetermined lower limit voltage ($V_{UVLO}$). (A sixth configuration.)

In the power supply semiconductor device according to any of the first to sixth configurations described above, preferably, the control circuit includes a first voltage divider circuit (110) configured to divide the voltage at the first input terminal, a second voltage divider circuit (120) configured to divide the voltage at the potential control terminal, and a differential amplifier circuit (130) configured to generate a differential signal ($S_{DIF}$) commensurate with the difference between a first comparison voltage resulting from voltage division by the first voltage divider circuit and a second comparison voltage resulting from voltage division by the second voltage divider circuit. In the supply period of the alternating-current voltage to the pair of input terminals, the control circuit may turn on and off the first switching element in accordance with the differential signal. (A seventh configuration.)

This helps suppress the terminal-to-terminal voltage across the main capacitor equal to or lower than a predetermined voltage ($V_{LIM}$) As a result, it is possible to hold low the required withstand voltage of the main capacitor.

According to another aspect of what is disclosed herein, a power supply apparatus includes the power supply semiconductor device according to any of the first to seventh configurations described above, the diode bridge, the full-wave rectifier circuit, the interphase capacitor, and the main capacitor. (An eighth configuration.)

The power supply apparatus according to the eighth configuration described above, preferably, further includes a power conversion circuit connected to the target wiring and to the potential control terminal. The power conversion circuit may be configured to convert a terminal-to-terminal voltage across the main capacitor into another voltage. (A ninth configuration.)

What is claimed is:

1. A power supply semiconductor device used in a power supply apparatus that feeds to a diode bridge an alternating-current voltage applied to a pair of input terminals to generate a full-rectified voltage on a target wiring, comprising:
    a first input terminal configured to receive a rectification voltage obtained by feeding the alternating-current voltage applied to the pair of input terminals to a full-wave rectifier circuit different from the diode bridge;
    a second input terminal configured to be connected to the target wiring;
    a potential control terminal configured to be connected to the target wiring through a main capacitor;
    a first switching element provided between the potential control terminal and a ground;
    a power failure sense circuit configured to sense, based on a voltage at the first input terminal, power failure in which supply of the alternating-current voltage to the pair of input terminals is cut off;
    a second switching element configured to, when the power failure is sensed, pass to the ground a current for discharging an interphase capacitor provided between the pair of input terminals and a current for discharging the main capacitor; and
    a control circuit configured to control the first and second switching elements,
    wherein
    the control circuit, in a supply period of the alternating-current voltage to the pair of input terminals, is configured to turn on and off the first switching element based on the voltage at the first input terminal and a voltage at the potential control terminal,
    the control circuit is configured to, when the power failure is sensed, perform a first discharge operation and then a second discharge operation,
    in the first discharge operation, the first switching element is kept off and the second switching element is kept on so that the interphase capacitor is discharged through a first discharging path that runs across the full-wave rectifier circuit, the first input terminal, and the second switching element, the first discharging path including the ground, and
    in the second discharge operation, the first and second switching elements are kept on so that the main capacitor is discharged through a second discharging path that runs across the first switching element, the second input terminal, and the second switching element, the second discharging path including the ground.

2. The power supply semiconductor device according to claim 1, wherein the power failure sense circuit is configured to
    sense an occurrence of the power failure based on how the voltage at the first input terminal varies,
    output a power failure sense signal indicating a result of sensing to the control circuit,
    during a sense period of the power failure, keep the power failure sense signal in an asserted state, and
    during a non-sense period of the power failure, keep the power failure sense signal in a negated state, and
    after the power failure sense signal switches from the negated state to the asserted state, when a predetermined wait time passes with the power failure sense signal kept in the asserted state, the control circuit is configured to start the first discharge operation.

3. The power supply semiconductor device according to claim 2, wherein the control circuit is configured to, after starting the first discharge operation, perform the first discharge operation only for a predetermined discharge time, and then start the second discharge operation.

4. The power supply semiconductor device according to claim 3, wherein the wait time is a first wait time, in performing the second discharge operation after the first discharge operation, the control circuit is configured to, after the power failure sense signal switches from the negated state to the asserted state, and when a predetermined second wait time passes, start the second discharge operation, and the second wait time is equal to or longer than a sum of the first wait time and the discharge time in the first discharge operation.

5. The power supply semiconductor device according to claim 2, wherein the control circuit is configured to, after starting the first discharge operation, and in response to a divided value of the voltage at the first input terminal becoming lower than a reference value, end the first discharge operation, and then start the second discharge operation.

6. The power supply semiconductor device according to claim 1, wherein the control circuit is configured to operate based on a voltage at the second input terminal, and
    the control circuit is further configured to, after starting the second discharge operation, end the second discharge operation when the voltage at the second input terminal becomes equal to or lower than a predetermined lower limit voltage.

7. The power supply semiconductor device according to claim 1, wherein the control circuit includes
    a first voltage divider circuit configured to divide the voltage at the first input terminal,
    a second voltage divider circuit configured to divide the voltage at the potential control terminal, and
    a differential amplifier circuit configured to generate a differential signal commensurate with a difference between a first comparison voltage resulting from voltage division by the first voltage divider circuit and a second comparison voltage resulting from voltage division by the second voltage divider circuit, and
    in the supply period of the alternating-current voltage to the pair of input terminals, the control circuit is configured to turn on and off the first switching element in accordance with the differential signal.

8. A power supply apparatus comprising:
    a power supply semiconductor device;
    a diode bridge circuit;
    a full-wave rectifier circuit;
    an interphase capacitor; and
    a main capacitor,
    wherein the power supply semiconductor device comprises a first input terminal configured to receive a rectification voltage obtained by feeding an alternating-current voltage applied to a pair of input terminals to the full-wave rectifier circuit different from the diode bridge circuit, a second input terminal configured to be connected to target wiring, a potential control terminal configured to be connected to the target wiring through the main capacitor, a first switching element provided between the potential control terminal and a ground, a power failure sense circuit configured to sense, based on a voltage at the first input terminal, power failure in which supply of the alternating-current voltage to the pair of input terminals is cut off, a second switching element configured to, when the power failure is sensed, pass to the ground a current for discharging the interphase capacitor provided between the pair of input terminals and a current for discharging the main capacitor, and a control circuit configured to control the first and second switching elements, wherein the control circuit, in a supply period of the alternating-current voltage to the pair of input terminals, turns on and off the first switching element based on the voltage at the first input terminal and a voltage at the potential control terminal, the control circuit, when the power failure is sensed, performs a first discharge operation and then a second discharge operation, in the first discharge operation, the first switching element is kept off and the second switching element is kept on so that the interphase capacitor is discharged through a first discharging path that runs across the full-wave rectifier circuit, the first input terminal, and the second switching element, the first discharging path including the ground, and in the second discharge operation, the first and second switching elements are kept on so that the main capacitor is discharged through a second discharging path that runs across the first switching element, the second input terminal, and the second switching element, the second discharging path including the ground.

9. The power supply apparatus according to claim 8, further comprising a power conversion circuit connected to the target wiring and to the potential control terminal, the power conversion circuit being configured to convert a terminal-to-terminal voltage across the main capacitor into another voltage.

* * * * *